US008725676B1

(12) United States Patent
Engler et al.

(10) Patent No.: US 8,725,676 B1
(45) Date of Patent: *May 13, 2014

(54) STATE CHANGE DETECTION

(75) Inventors: Joseph J. Engler, Coggon, IA (US); Timothy B. Jones, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/208,039

(22) Filed: Aug. 11, 2011

Related U.S. Application Data

(60) Provisional application No. 61/470,390, filed on Mar. 31, 2011.

(51) Int. Cl.
*G06F 7/00* (2006.01)
*G06F 17/00* (2006.01)

(52) U.S. Cl.
USPC .......................................... 707/603; 707/703

(58) Field of Classification Search
None
See application file for complete search history.

(56) References Cited

U.S. PATENT DOCUMENTS

| | | | |
|---|---|---|---|
| 7,861,299 | B1 | 12/2010 | Tidwell et al. |
| 8,170,894 | B2 | 5/2012 | Yitts |
| 2006/0265444 | A1* | 11/2006 | Shiomi et al. ................ 708/446 |
| 2007/0239753 | A1* | 10/2007 | Leonard ........................ 707/101 |
| 2009/0259521 | A1* | 10/2009 | Yitts ............................... 705/10 |
| 2009/0318775 | A1* | 12/2009 | Michelson et al. ........... 600/301 |
| 2011/0106453 | A1* | 5/2011 | Krieftewirth .................... 702/19 |
| 2012/0290879 | A1* | 11/2012 | Shibuya et al. .................. 714/26 |

OTHER PUBLICATIONS

U.S. Appl. No. 13/208,071, filed Aug. 11, 2011, Engler et al.
U.S. Appl. No. 13/208,099, filed Aug. 11, 2011, Engler et al.
Aydin, I., et al. Chaotic-based Hybrid Negative Selection Algorithm and its Applications in Fault and Anomaly Detection, Expert Systems with Applications, vol. 37, No. 7, pp. 5285-5294, 2010.
Chakraborty, S., et al., Symbolic Identification and Anomaly Detection in Complex Dynamical Systems, American Control Conference, Seattle, WA, pp. 2792-2797, Jun. 11-13, 2008.
Chandola, V., Anomaly Detection: A Survey, Sep. 2009, 74 pages.
Chen, J., Chaotic Dynamics of the Fractionally Damped van der Pol Equation, Chaos, Solitons and Fractals, vol. 35, No. 1, pp. 188-198, 2008.
Chung, K., Markov Chains with Stationary Transition Probabilities, New York: Springer, 1960. 145 pages.
Crutchfield, J., et al., Inferring Statistical Complexity, Physical Review Letters, vol. 63, No. 2, pp. 105-108, 1989.

(Continued)

*Primary Examiner* — Taelor Kim
(74) *Attorney, Agent, or Firm* — Donna P. Suchy; Daniel M. Barbieri

(57) ABSTRACT

A method of detecting a change in the state of a system is provided. The method comprises embedding time series data relating to the system within a reconstructed phase space. The method further comprises partitioning the reconstructed phase space into a plurality of regions. The method further comprises generating a matrix having a plurality of cells. The matrix comprises a row and a column for each of the plurality of regions. A value stored in each cell is based on a probability that the system will transition from a first region associated with the cell to a second region associated with the cell and a rate of separation of trajectories of the embedded data within at least one of the first region and the second region.

14 Claims, 22 Drawing Sheets

(56) References Cited

OTHER PUBLICATIONS

Eckhardt, B., Local Lyapunov Exponents in Chaotic Systems, Physica D, vol. 65, No. 1-2, pp. 100-108, 1993.
Eckmann, J., Recurrance Plots of Dynamical Systems, Europhysics Letters, vol. 4, No. 9, pp. 973-977, 1987.
Geisel, T., Anomalous Diffusion in Intermittent Chaotic Systems, Physical Review Letters, vol. 52, No. 22, pp. 1936-1939, 1984.
Grassberger, P., et al., On Noise Reduction Methods for Chaotic Data, Chaos, vol. 3, No. 2, pp. 127-141, 1993.
Hively, L., et al., Enhancements in Epilepsy Forewarning via Phase-Space Dissimilarity, Journal of Clinical Neurophysiology, vol. 22, pp. 1-23, 2005.
Lang, M. et al., Noise Reduction using an Undecimated Discrete Wavelet Transform, IEEE Signal Processing Letters, vol. 3, No. 1, pp. 1-6, 1996.
Rao, C., et al., Review and Comparative Evaluation of Symbolic Dynamic Filtering for Detection of Anomaly Patterns, Springer-Verlag, vol. 3, No. 2, pp. 101-114, 2009.
Schreiber, T., Extremely Simple Nonlinear Noise-Reduction Method, Physical Review E, vol. 47, No. 4, pp. 2401-2404, 1993.
Sheu, L., Chaotic Dynamics of the Fractionally Damped Duffing Equation, Chaos, Solitons and Fractals, vol. 32, No. 4, pp. 1459-1468, 2007.
Sprott, J., A Simple Chaotic Delay Differential Equation, Physics Letters A, vol. 366, No. 4-5, pp. 397-402, 2007.
Takens, F., Detecting Strange Attractors in Turbulence, Dynamical Systems and Turbulence: Lecture Notes in Mathematics: Springer, 1981, vol. 898, pp. 366-381.
Tykierko, M., Using Invariants to Change Detection in Dynamical Systems with Chaos, Physica D, vol. 237, No. 1, pp. 6-13, 2008.
Xiong, W. et al., Anomaly Detection of Network Traffic based on the Largest Lyapunov Exponent, in $2^{nd}$ Int'l Conf. on Advanced Computer Control, Shenyang, pp. 581-585, 2010.
Zhao, P. et al., Chaotic Tim Series Prediction: From One to Another, Physics Letters A, vol. 373, No. 25, pp. 2174-2177, 2009.
U.S. Appl. No. 13/208,039, filed Aug. 11, 2011, Engler et al.
Acharya, U. R., et al. Classification of heart rate data using artificial neural network and fuzzy equivalence relation, Pattern Recognition, vol. 36, 2003, pp. 61-68.
Anuradha, B., et al. ANN for Classification of Cardiac Arrhythmias, ARPN Journal of Engineering and Applied Sciences, vol. 3, No. 3, Jun. 2008, pp. 1-6.
Bernaola-Galvan, P., et al. Scale Invariance in the Nonstationarity of Human Heart Rate, Physical Review letters, vol. 87, No. 16, Oct. 15, 2001, 4 pages.
Eckmann, J., Ergodic theory of chaos and strange attractors, Reviews of Modern Physics, vol. 57, No. 3, Part I, Jul. 1985, pp. 617-656.
Goldberger, A. L., et al. Chaos and Fractals in Human Physiology, Scientific American, Feb. 1990, 7 pages.
Guzzetti, S., et al., Non-linear dynamics and chaotic indices in heart rate variability of normal subjects and heart-transplanted patients, Cardiovascular Research, vol. 31, 1996, pp. 441-446.
Holzfuss, J., et al., Lyapunov exponents from time series, Lecture Notes in Mathematics, vol. 1486, pp. 263-270. Berlin: Springer.
Kantz, H., et al. Nonlinear Time Series Analysis, 2003, Second Edition, Cambridge University Press, Cambridge, UK, 385 pages.
Kennel, M. B., et al., Determining embedding dimension for phase-space reconstruction using a geometrical construction, Physical Review A, vol. 45, No. 6, Mar. 15, 1992, pp. 3403-3411.
Palodeto, V., et al. Methodology for Classification and Analysis of Neonate and Adult ECG, Proc. of the IFMBE World Congress on Medical Physics and Biomedical Engineering, vol. 14/2, 2006, pp. 1214-1217.
Ramirez, E., et al., Hybrid system for cardiac arrhythmia classification with fuzzy K-nearest neighbors and multi layer perceptions contained by a fuzzy interference system, The 2010 Int'l. Joint Conf on Neural Networks, 2010, pp. 1-6, Barcelona.
Rosenstein, M., et al., A practical method for calculating largest Lyapunov exponents from small data sets, Physica D: Nonlinear Phenomena, vol. 65, No. 1-2, Nov. 20, 1992, 60 pages.
Witten, I.H., Data Mining: Practical Machine Learning Tools and Techniques, 2005, Second Edition, Morgan Kaufman, San Francisco, CA, 543 pages.
Wolf, A., et al., Determining Lyapunov Exponents from a Time Series, Physica D: Nonlinear Phenomena, vol. 16, No. 3, 1985, pp. 285-317.
Yaghouby, F., et al. An arrhythmia classification method based on selected features of heart rate variability signal and support vector machine-based classifier, Proc. of the IFMBE World Congress on Medical Physics and Biomedical Engineering, vol. 25, 2009, pp. 1928-1931.
Zhu, C., et al. A new method of discriminating ECG signals based on chaotic dynamic parameters, Electronics and Signal Processing LNEE, vol. 97, 2001, pp. 299-306.
Office Action for U.S. Appl. No. 13/208,071, mail date Mar. 18, 2013, 9 pages.
Office Action for U.S. Appl. No. 13/208,099, mail date Apr. 19, 2013, 24 pages.

* cited by examiner

US 8,725,676 B1

STATE CHANGE DETECTION

CROSS-REFERENCE TO RELATED PATENT APPLICATIONS

This application claims priority from U.S. Provisional Application No. 61/470,390, filed Mar. 31, 2011, which is incorporated herein by reference in its entirety. The present disclosure is related to U.S. patent application Ser. No. 13/208,071, titled "Security Threat Detection," and U.S. patent application Ser. No. 13/208,099, titled "State Change Detection Using Multi-Dimensional Phase Space," both of which were filed concurrently with the present application and both of which are incorporated herein by reference in their entireties.

BACKGROUND

The present disclosure relates generally to the field of detecting changes in the state of various systems.

Many domains, including but not limited to industrial facility and residential control systems, health care, and computer networking, are concerned with system state change detection. The early detection of system changes can assist in preventing catastrophic failure in critical systems such as the power grid. Additionally, state change detection can warn of such issues as cyber attacks on computing networks or premature failures in electronic devices. The detection of these phenomena can be a challenging task.

SUMMARY

One embodiment of the disclosure relates to a method of detecting a change in the state of a system. The method comprises embedding time series data relating to the system within a reconstructed phase space. The method further comprises partitioning the reconstructed phase space into a plurality of regions. The method further comprises generating a matrix having a plurality of cells. The matrix comprises a row and a column for each of the plurality of regions. A value stored in each cell is based on a probability that the system will transition from a first region associated with the cell to a second region associated with the cell and a rate of separation of trajectories of the embedded data within at least one of the first region and the second region.

Another embodiment relates to a system comprising an electronic processor configured to embed time series data relating to a system within a reconstructed phase space and partition the reconstructed phase space into a plurality of regions. The electronic processor is further configured to generate a matrix having a plurality of cells. The matrix comprises a row and a column for each of the plurality of regions. A value stored in each cell is based on a probability that the system will transition from a first region associated with the cell to a second region associated with the cell and a rate of separation of trajectories of the embedded data within at least one of the first region and the second region.

Another embodiment relates to one or more computer-readable media having instructions stored thereon that are executable by one or more processors to execute a method. The method comprises embedding time series data relating to a system within a reconstructed phase space and partitioning the reconstructed phase space into a plurality of regions. The method further comprises generating a matrix having a plurality of cells. The matrix comprises a row and a column for each of the plurality of regions. A value stored in each cell is based on a probability that the system will transition from a first region associated with the cell to a second region associated with the cell and a rate of separation of trajectories of the embedded data within at least one of the first region and the second region.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1A:
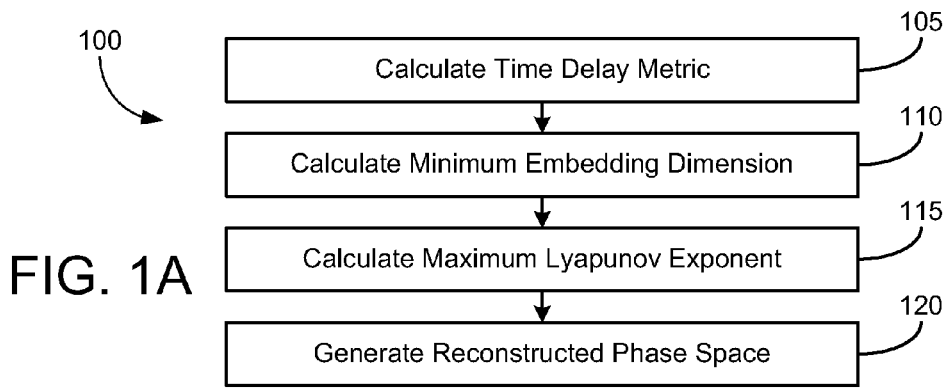
FIG. 1A is a flow diagram of a process for embedding data within a reconstructed phase space according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of control devices for various types of applications or analyzed systems.

Referring generally to the figures, systems and methods for detecting system state changes and/or anomalies are disclosed according to various exemplary embodiments. Exemplary embodiments disclosed herein generate a representation of the normality of a system (e.g., the operation of a system under normal conditions, which is defined based on each individual system or application) under consideration and monitor data (e.g., streaming data) for divergence from that normality. Data (e.g., time series data) regarding the system under consideration is embedded within a reconstructed phase space which may be created through the calculation of a time delay metric and an embedding dimension metric.

The phase space is then partitioned into a grid or other partitioned structure (e.g., an N×N grid such that regions of phase space are equally divided into square cells of size 1/N×1/N, where N may be a predetermined or user-defined parameter). The embedded phase space may be plotted by assigning to each point in the phase space the centroid, or center point, of the grid cell representing the region of phase space of which that point is a member. Each centroid can be considered a region of phase space, or a state of the dynamical system. This plot is referred to herein as the Ergodicity plot of the embedding phase space.

The Ergodicity plot may then be used to construct a transition matrix that can in turn be used to detect system changes as new data is provided to (e.g., streamed into) the systems and/or processes. The system can utilize a control system or algorithm (e.g., implemented in software) to create the transition matrix and/or detect the system state changes. Such transition matrixes are referred to herein as ergodic transition matrixes (ETMs). An ETM of normality may be generated representing a normal state of the system being considered. Subsequent ETMs may be generated using new data as it is encountered and/or provided to the algorithm. Changes in the state of the system (e.g., changes above a specified threshold) can be detected by comparing the subsequent ETMs to the ETM of normality for the system. Various exemplary embodiments disclosed herein have a very small computational footprint and enable highly effective detection of small changes and/or anomalies in a chaotic system in real time or near-real time. Various embodiments may also be tunable with user defined parameters to assist in reducing false positive rates in different applications.

Referring now to FIG. 1, a flow diagram of a process 100 for embedding data within a reconstructed phase space is shown according to an exemplary embodiment. Time series data relating to a system being analyzed is received and embedded within a reconstructed phase space. The time series data may be data relating to one or more aspects of the system being analyzed that is measured at regular intervals. Time series data includes a series or sequence of data points, each of which is measured at and/or associated with a particular point in time. In some embodiments, time series data may be measured at regular periodic time intervals (e.g., 10 milliseconds, one second, 30 seconds, one minute, 15 minutes, one hour, one day, etc.). The data measured and/or received may be sensor data and may represent various conditions relating to the state of the system. For example, in one embodiment, the data (e.g., electrocardiogram data) may represent electrical signals associated with the beating of a human heart used to monitor the state of the heart.

The time series data is used to reconstruct a phase space representation of various states of the system. According to an exemplary embodiment, reconstruction of the phase space may be done using several metrics, including a time delay metric and a minimum embedding dimension. The time delay metric represents a time delay or time lag used to construct a new set of coordinates in the newly reconstructed phase space. The minimum embedding dimension represents a minimum number of dimensions that may be used to reconstruct, or unfold, the new phase space (e.g., the metric phase space) back to a multivariate phase space that is representational of the original phase. Once the time delay metric and minimum embedding dimension have been determined, a metric representing the rate of separation of trajectories in the new embedded phase space may be determined. In some embodiments, this metric may be a maximum Lyapunov exponent of the nonlinear system. Exemplary methods of constructing the embedded phase space are provided in U.S. patent application Ser. No. 13/051,672, filed Mar. 18, 2011, titled "Prediction Method," listing as inventor Joseph J. Engler, which is incorporated herein by reference in its entirety. In some embodiments, the embedded phase space may be constructed in a manner similar to that proposed by Takens in "Detecting Strange Attractors in Turbulence." Takens, F., "Detecting Strange Attractors in Turbulence," in *Dynamical Systems and Turbulence: Lecture Notes in Mathematics*: Springer, 1981, Vol. 898, pp. 366-381.

At step 105, a time delay metric, or delay factor, for use in embedding time series data within the reconstructed phase space is determined. The time delay metric represents a time delay or time lag used to construct a new set of coordinates in the newly reconstructed phase space. In some embodiments, a time delay metric $\tau$ may be calculated to be the first value for which an autocorrelation function (e.g., representing a cross-correlation of the time series data signal with itself as a function of time separation) falls below 1/e. The autocorrelation function may be represented as follows:

$$r_\tau = \frac{\sum_{t=\tau+1}^{n}(x_t - \bar{x})(x_{t-\tau} - \bar{x})}{\sum_{t=1}^{n}(x_T - \bar{x})^2}$$

In the above, $\bar{x}$ is the mean of the time series data, $x_t$ is the value of the data point x at time t, and r is the autocorrelation coefficient.

At step 110, a minimum embedding dimension for the reconstructed phase space may be determined. The minimum embedding dimension represents a minimum number of dimensions that may be used to reconstruct, or unfold, the new phase space (e.g., the metric phase space) back to a multivariate phase space that is representational of the original phase. A scalar time series for a given variable of the nonlinear system may be represented by the expression $x(n_i) = \{x_0, x_{0+\tau}, x_{0+2\tau}, \ldots, x_{0+(d-1)\tau}\}$. The time delay factor $\tau$ may be calculated from the autocorrelation of the variable as described above with respect to step 105. The symbol d in the scalar time series expression for the variable x above is the minimal embedding dimension for which the scalar time series is most representational of the original phase space.

In some embodiments, a False Nearest Neighbors ("FNN") methodology may be used to calculate the minimum embedding dimension d. A FNN methodology is a procedure for obtaining the minimum embedding dimension for phase space reconstruction based on the neighborhood of points whose distance is below a given threshold $\epsilon$. Consider a point $x(n)$ and a point $x^r(n) \in U(x(n))$ which is the $r^{th}$ nearest neighbor of $x(n)$ in the neighborhood of points around $x(n)$. The distance between these two points in d dimensional space may be calculated as follows:

$$R_d^2(n, r) = \sum_{k=0}^{d-1} [x(n+k\tau) - x'(n+k\tau)]^2$$

In the above, $\tau$ is the time delay factor from the autocorrelation function. In some embodiments, all points within the neighborhood of $x(n)$ (e.g., within the threshold distance $\epsilon$) may be calculated.

The embedding dimension is then increased from dimension d to dimension d+1 such that, by time delay embedding, the (d+1)th coordinate is added to each of the vectors $x(n)$. After the dimension is increased, the distance of each point $x'(n) \in U(x(n))$ to $x(n)$ is again calculated. Those points whose distance to $x(n)$ is larger than c are removed from the neighborhood $U(x(n))$. The removed points are considered false nearest neighbors to $x(n)$ since they were nearest neighbors in the smaller embedding dimension but are not nearest neighbors to $x(n)$ when the embedding dimension is expanded. In some embodiments, the proper embedding dimension d is determined to be the smallest embedding dimension d in which no false nearest neighbors are discovered. In other embodiments, the proper embedding dimension d may be determined to be the embedding dimension d in which the number of false nearest neighbors discovered is less than a certain maximum threshold of false nearest neighbors.

The operation of the FNN method may be illustrated with reference to FIGS. 1B and 1C. FIG. 1B illustrates a Henon map associated with a reconstruction of an exemplary phase space using only an x variable. For d=1, the reconstructed scalar phase space is a line. In d=1 dimension embedding space two points a and b are illustrated as being close to a point c. These points are nearest neighbors of c. However, when the embedding dimension d is increased to d=2, as illustrated in FIG. 1C, point a remains close to point c but point b is no longer in the neighborhood of point c. Point b was a false neighbor of point c in d=1 dimension embedding space due to the constriction of the embedding space.

Referring again to FIG. 1A, at step 115, a maximum Lyapunov exponent of the system is calculated. The maximum Lyapunov exponent is a measure of the rate of separation (e.g., divergence or convergence) of trajectories or orbits in the reconstructed phase space (e.g., pseudo-periodic cycles of the system in which the system visits nearby points in the reconstructed phase space). Two trajectories $x(n_1)$ and $y(n_1)$ in the reconstructed phase space may be represented as follows:

$$x(n_i) = \{x_0, x_{0+\tau}, x_{0+2\tau}, \ldots, x_{0+(d-1)\tau}\}$$

$$y(n_i) = \{y_0, y_{0+\tau}, y_{0+2\tau}, \ldots, y_{0+(d-1)\tau}\}$$

The distance between $x(n_1)$ and $y(n_1)$ may be represented by a value $\epsilon$ (e.g., a small value). The distance between the trajectories at some time $\Delta n$ in the future may be represented by the following:

$$\epsilon_{\Delta n} = \|x_{n_1 + \Delta n} - y_{n_1 + 6\Delta n}\|$$

The maximum Lyapunov exponent $\lambda$ of the trajectories for the selected variable may be determined as follows:

$$\varepsilon_{\Delta n} \cong \varepsilon_0 e^{\lambda \Delta n} \text{ or}$$

$$\lambda = \lim_{n \to \infty} \frac{1}{n} \sum_{n}^{\infty} \ln\left(\frac{\|x_{n_1 + \Delta n} - y_{n_1 + \Delta n}\|}{\|x_{n_1} - y_{n_1}\|}\right)$$

The above represents the maximum Lyapunov exponent $\lambda$ of the trajectories as n approaches $\infty$. In some embodiments, a more accurate maximum Lyapunov exponent may be calculated to determine the degree of non-linearity with the system by using a time series analysis of the Lyapunov exponent. Consider a time series T and a neighborhood $U(x(n_1))$ about a point $x(n_1) \in T$, such that each point $y_{n1} \in U(x(n_1))$ has a distance from $x(n_1)$ of some small value $\epsilon$. The Lyapunov exponent of the time series T can be calculated as follows:

$$\lambda \approx \frac{1}{N} \sum_{n_0=1}^{N} \ln\left(\frac{1}{|U(x(n_1))|} \sum_{y_n \in U(x(n_1))} |x_{n_0 + \Delta n} - y_{n + \Delta n}|\right)$$

For $\lambda < 0$, the trajectories are periodic and the system is not chaotic. For $\lambda = 0$, the system approaches a marginally stable point. If $\lambda > 0$, the two trajectories are diverging from one another at an exponential rate, the system is chaotic, and the degree of non-linearity of the system containing $x(n_1)$ and $y(n_1)$ may be estimated exponentially by the maximum Lyapunov exponent $\lambda$. For a given system, there are as many Lyapunov exponents as there are dimensions in the phase space of the system.

Figure 1B:
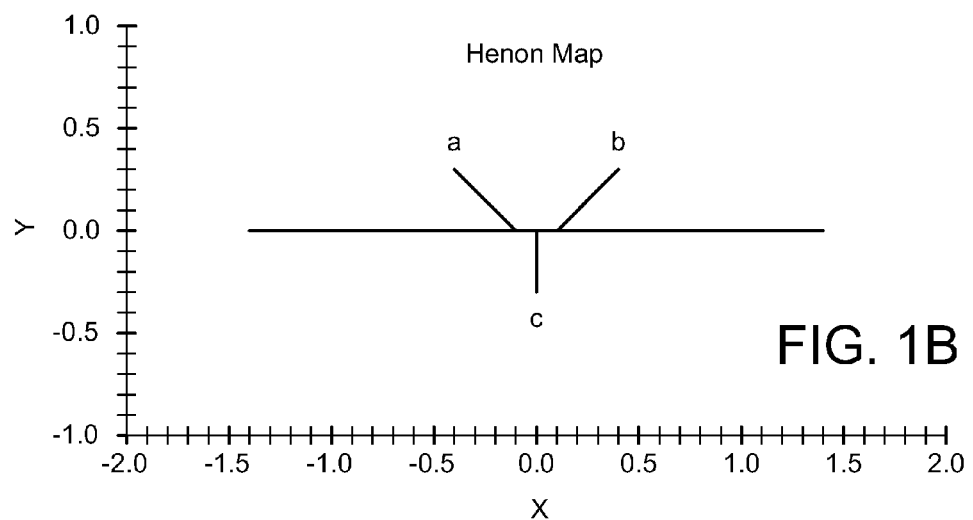
FIGS. 1B and 1C are Henon maps associated with a reconstruction of an example phase space using different embedding dimensions according to an exemplary embodiment.
Figure 1C:
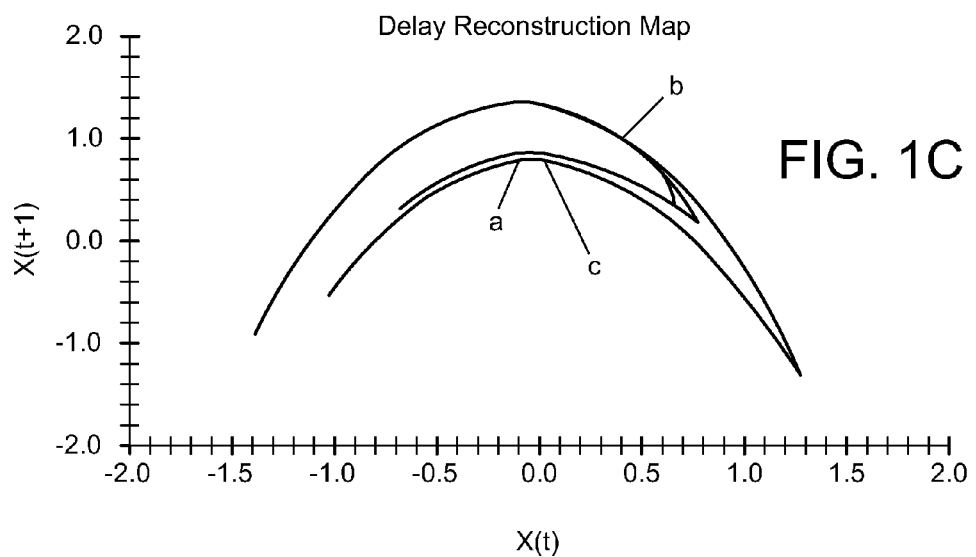

Referring still to FIG. 1A, at step 120, the reconstructed phase space may be generated. The reconstructed phase space may be generated by selecting one variable of the system and generating a set of d dimensional vectors of the form $\bar{x} = \{x_{t+\tau}, \ldots, x_{t+d\tau}\}$ where $\tau$ is the time delay calculated at step 105 and d is the minimum embedding dimension calculated at step 110. The Lyapunov exponent calculated at step 115 is indicative of the rate of divergence or convergence of the nearby trajectories in the embedded phase space. In some embodiments, this divergence or convergence may be visible in a plot of the embedded phase space. In other embodiments, higher dimension phase spaces may not be plotted.

Figure 1D:
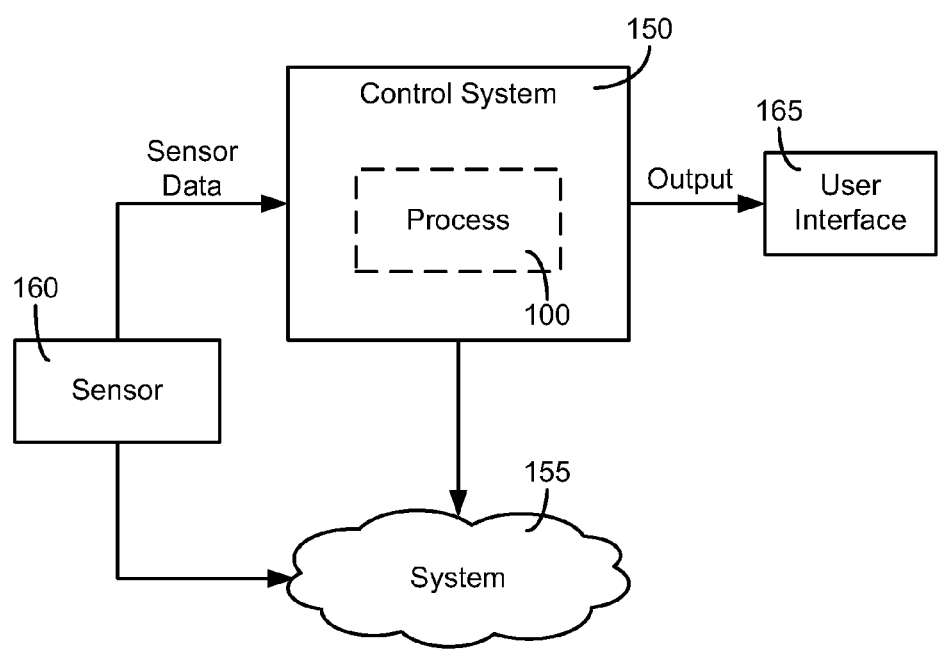
FIG. 1D is a block diagram of a control system configured to analyze a system according to an exemplary embodiment.

Referring now to FIG. 1D, a block diagram of a control system 150 is shown according to an exemplary embodiment. System 150 may be used, for example, to implement process 100 and/or various other exemplary methods described herein. A sensor 160 is configured to measure or receive data from a system 155 that is being analyzed. Control system 150 is configured to receive the captured sensor data (e.g., time series data) and generate the reconstructed phase space. In some embodiments, system 150 may be configured to generate an Ergodicity plot (EP) and/or ergodic transition matrix (ETM), as described in detail in the present disclosure. System 150 may be configured to output data (e.g., data relating to the reconstructed phase space, EP, and/or E™) to a user interface 165 for viewing by a user and/or back to system 155 for use in making changes to system 155.

Once the data has been embedded in the reconstructed phase space, one or more transition matrixes can be generated and used (e.g., in conjunction with an ergodicity plot) to understand mathematically the regions of phase space which are visited by the orbits of the chaotic system. One example of a transition probability matrix that represents the transition probabilities of a system is the Markov Chain. Chung, K., *Markov Chains with Stationary Transition Probabilities*, 2nd ed. New York: Springer, 1967. The transition matrixes utilized herein, which may be referred to as ergodic transition matrixes (ETMs), differ from a Markov model, for example, through the use of a local Lyapunov exponent of the region represented by a member of a partitioned phase space to generate a transition measure rather than a transition probability.

To construct an ETM, the embedded phase space may be partitioned into a grid of partitions (e.g., equivariant partitions). In one embodiment, the partition may result in a $$\frac{1}{\sqrt{n}} \times \frac{1}{\sqrt{n}}$$

square matrix. For each cell, m, of the matrix, the probability, p, that the orbit transitions from the ith region of the partitioned phase space to the jth region may be calculated. The local Lyapunov exponent for each partitioned region may also be calculated using methods similar to those above and using data only from the local region for which the Lyapunov exponent is being calculated. The ergodic transition measure etm ($m_{i,j}$) for the cell $m_{i,j}$ may be determined based on the determined probability and local Lyapunov exponent (e.g., the Lyapunov exponent associated with the ith region) and may be calculated as follows:

$$etm(m_{i,j}) = \rho\lambda$$

The following Table 1 illustrates a small portion of a sample ETM (mean monthly temperature for Cedar Rapids, Iowa, USA):

TABLE 1

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

TABLE 1-continued

| 0 | 0 | 0 | 0 | 0 | 0 | 0 | 0 | 0 |
|---|---|---|---|---|---|---|---|---|
| 0 | 0 | 0 | 0.000779 | 0.000779 | 0 | 0 | 0 | 0 |

Each ETM may contain both a row and a column for each local region in the phase space (e.g., grid). The value in each cell is a function (e.g., product) of (1) the probability that the orbit will transition from the first region (e.g., the region in the row) of the partitioned phase space to the second region (e.g., the region in the column) and (2) the rate of separation (e.g., divergence or convergence) of trajectories or orbits in the local region (e.g., the row region) of the reconstructed phase space. As can be seen in Table 1, the ergodic transition matrix is often a sparse matrix. The sparsity of the ETM helps enable state change detection, as discussed in further detail below, that can be performed with limited computational resources and in real time and near-real time computing applications.

Figure 2:
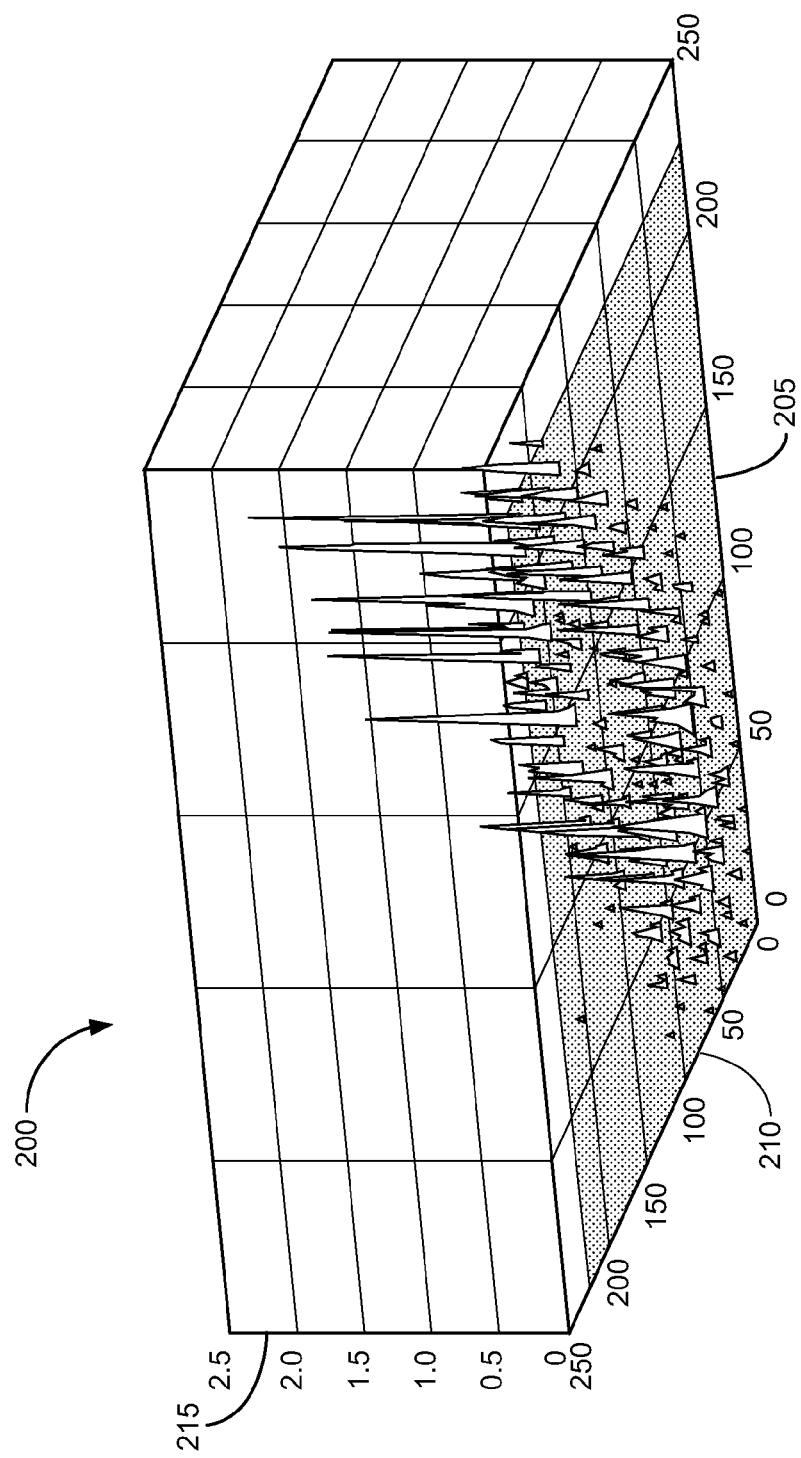
FIG. 2 is a surface plot of a sample ergodic transition matrix according to an exemplary embodiment.

FIG. 2 illustrates a surface plot 200 of the monthly mean temperature ETM according to an exemplary embodiment. Axes 205 and 210 represent coordinates (e.g., columns and rows) in the ETM. Axis 215 represents the value of the ergodic transition measure (e.g., the measure stored in a particular row and column of the ETM) stored in the cells of the ETM. Surface plot 200 represents the entire ETM for which a portion is shown in Table 1. Inspection of surface plot 200 illustrates the general sparsity of the entire ETM.

The ergodic transition matrix is highly effective at representing the manners by which the chaotic system traverses the embedding phase space. Further, the partitioning of the embedding phase space can be viewed as the generation of system states where each member of the partition represents a specific system state. Then, the ETM can be viewed as representational of the traversal of system states by the chaotic system and can be used for system state change and anomaly detection.

The ETM is a concise and manageable representation of the ergodicity of the chaotic system, or likelihood that states will or will not recur. As such, it contains useful information pertaining to the normal operating conditions of the chaotic system under consideration. It is possible to utilize the ETM to determine when the chaotic system is experiencing small state changes which could indicate the early occurrence of anomalous features (e.g. changes in the system states which indicate system degradation, possibly to failure).

Consider a chaotic system which is currently operating without anomalies or outliers and is not experiencing changes in the system states. Such a normal operating state for a system such as the human heart, for example, may be electrical pulses associated with a normal, healthy heartbeat. In an industrial control system example, a normal operating state may be a state in which the system is operating in a normal manner without any active alarms or slowdown in production. The attractor representing the chaotic system which is operating without anomalies and is not experiencing state changes is representational of the system's normal operating conditions. As such, it is possible to form the ergodicity plot (EP) and ergodic transition matrix (ETM) from the system's attractor of normality. The ETM generated from the system's attractor, and EP, forms a baseline pattern of trajectory traversal within the embedding phase space and may be used as a benchmark by which future traversals may be measured. This type of ETM may be defined as the ETM of normality, $ETM_{Norm}$. It should be noted that, as with all machine learning techniques, the larger the training, or in this case normal, dataset available, within a reasonable limit, the more accurate the model will be. Thus, a sufficient sized sample of the normal operating states is desirous for the algorithm. The size of the dataset required to establish a sufficient ETM of normality depends upon the system under consideration and the level of acceptable accuracy of the model.

Given the ETM of Normality, $ETM_{Norm}$, for the system under consideration, it is possible to stream new data into the algorithm and compare the ETM of the new data to the $ETM_{Norm}$. To facilitate the comparison, a buffer may be maintained, in a moving window method, of the new streaming data, as single data points do not facilitate the generation of an ETM. The size of this buffer may depend on the system being analyzed. In some embodiments, a sufficient buffer size may consist of 4-5 complete orbits of the chaotic system. The ETM of the streaming data may be created each time a complete (mean) orbit has been added to the buffer. As the new orbit is added to the buffer, the previous first orbit of the buffer may be removed to facilitate maintaining a constant buffer size. The absolute difference between the ETM for the buffer, $ETM_{Buf}$, and the $ETM_{Norm}$ represents the degree of system state change, $\Delta s$, as follows:

$$\Delta s = |ETM_{Norm} - ETM_{Buf}|$$

The degree of system state change, $\Delta s$, can be used to warn of systems that may be experiencing shifts in their operating states, as these phenomena will appear as differences between the buffer ETM and the ETM of normality. It is possible to set a threshold, $\epsilon$, based on the degree of state change metric, $\Delta s$, such that a warning is given for state changes $\Delta s > \epsilon$. The degree of system state change metric may be sensitive to even small changes in the system operation and is therefore highly effective for state change detection. The use of the alarm threshold affords the tuning of the state change detection algorithm to reduce false positive rates (e.g., if the threshold is set too low, an increased number of false positives may result, and if the threshold is set too high, anomalies may be missed). The buffer of the detection algorithm forms a moving window as new data is streamed into the system. Therefore, it is possible to continue to compare new data as it is encountered. Additionally, it is possible to evolve the $ETM_{Norm}$ to include recently encountered data, such as may be desired for systems that may include a break in period, or period of time before a normal state of operation of the system is encountered. In such systems it may be more desirable to consider the initial data as transient to the actual $ETM_{Norm}$. The evolution of the $ETM_{Norm}$ and determination of the appropriate timing and amount of training data to determine the $ETM_{Norm}$ is system dependent.

Due to the compact size of the ETM (e.g., as a real valued matrix), exemplary embodiments disclosed herein could be used in a real time monitoring system with little computational overhead. The $ETM_{Norm}$ may be only a matrix of state change metrics, double precision, which may be easily stored in resident memory for even the smallest of systems. The buffer ETM may be generated with little overhead as well, making embodiments disclosed herein appropriate for real or near real-time detection systems.

Figure 4:
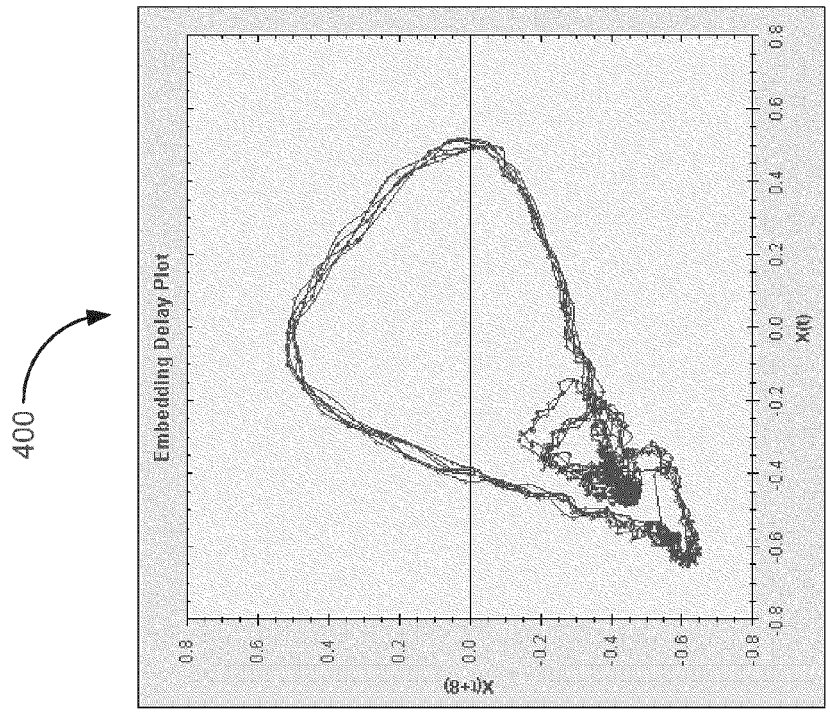
FIG. 4 is a phase space plot of the electrical pulses shown in FIG. 3 according to an exemplary embodiment.
Figure 3:
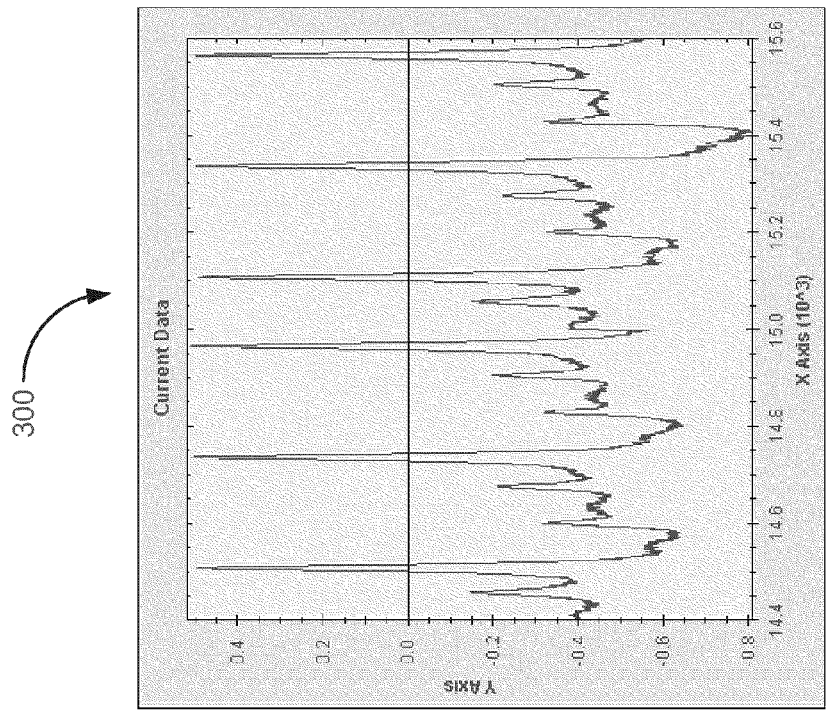
FIG. 3 is a graph illustrating electrical pulses associated with the beating of a human heart according to an exemplary embodiment.

FIGS. 3 and 4 can be used to illustrate the operation of an ETM-based state change detection method in the context of monitoring the human heart with a chaotic detection algorithm according to exemplary embodiments (the human heart provides an analogy to acoustic sensing systems). FIG. 3 illustrates a graph 300 showing electrical pulses associated with the beating of a human heart. FIG. 4 illustrates a phase space plot 400 of the electrical pulses shown in FIG. 3. A confusion matrix illustrating the accuracy of the chaotic detection algorithm is shown in Table 2:

TABLE 2

|  | True Anomaly | False Anomaly |
|---|---|---|
| True Anomaly | 31 | 1 |
| False Anomaly | 0 | 982,156 |

The confusion matrix indicates the number of true anomalies detected in the upper left cell (31, the number of false anomalies detected in the upper right cell (1), and the number of anomalies that were missed in the lower-left cell (0). As can be seen in Table 2, the ETM-based state change detection method may have a high degree of accuracy at detecting anomalies and small system state shifts while maintaining low false positive rates.

One application of the exemplary ETM-based state change detection methods disclosed herein is in the area of cybersecurity (e.g., security of computing and information systems). Cybersecurity has risen in criticality to the level of a national security interest. Personal, corporate, military and government systems are now affected by the implications of potential attack. As such, a great amount of effort and research support has been funneled to the domain. Recently, the U.S. Defense Advances Research Projects Agency (DARPA) opened two requests for proposal (RFPs) centered on this domain. The U.S. Department of Homeland Security has also opened a RFP in the domain of cybersecurity, and the U.S. Department of Energy has indicated the need for security on the cyber systems which control the nation's power grids. Existing cybersecurity systems may be incapable of adapting rapidly enough to changes in the attack profiles due to their use of list based detection. For example, some systems utilize blacklists (e.g., lists indicating locations or resources that cannot be accessed due to known security risks) or whitelists (e.g., lists containing locations or resources that are allowed to be accessed as they are believed to pose little security risks, such that all other resources may be restricted). Further, some cybersecurity systems may result in a large number of false positives.

The exemplary ETM-based state change detection methods disclosed herein may be used to accurately detect cyber attacks on computing systems. Single or multiple computing systems may be monitored for any system shifts or anomalies that occur in the system. Use of such ETM-based state change detection methods may allow for more accurate detection and/or a lower number of false positives as compared to list-based detection systems. ETM-based state change detection methods may also allow for threats to be detected as they occur, rather than waiting until the threats are encountered and updating a list based on the threats. Accordingly, the damage caused by such threats may be reduced. While various embodiments are described here with respect to cybersecurity applications, it should be noted that such embodiments may be equally applicable to different applications and contexts as well.

In some instances, such as with data derived from an experimental time series rather than exact equations of motion, the embedding phase space can prove to be of little added assistance to the visualization of the dynamics of the system in general. This may be due, in part, to the "bird's nest" quality of the phase space often experienced in visualization of traditional embedding phase space for such data. Exemplary embodiments disclosed herein may be used to determine or model normality within deterministically chaotic systems and to better represent the dynamics in a course-grained fashion for those scenarios where the normal embedding phase space is of little assistance.

Various methodologies have been presented in the domain of anomaly detection and/or the analysis of specific equations of motion. See, e.g., Chandola, V., Banerjee, A., and Kumar, V., "Anomaly Detection: A Survey," Vol. 41, No. 3, 2009; Aydin, I., Karakose, M., and Akin, E., "Chaotic-based Hybrid Negative Selection Algorithm and its Application in Fault and Anomaly Detection," Vol. 37, No. 7, 5285-5294 2010; Geisel, T. and Thomae, S., "Anomalues Diffusion in Intermittent Chaotic Systems," Vol. 52, No. 22, pp. 1936-1939, 1984; Xiong, W., Hu, H., Yang, Y., and Wang, Q., "Anomaly Detection of Network Traffic based on the Largest Lyapunov Exponent," in 2nd Intl Conf on Advanced Computer Control, Shenyang, 2010, pp. 521-585; Sheu, L., Chen, H., Chen, J., and Tam, L., "Chaotic Dynamics of the Fractionally Damped Duffing Equation," Vol. 32, No. 4, pp. 1459-1468, 2007; Chen, J. and Chen, W., "Chaotic Dynamics of the Fractionally Damped van der Pol Equation," Vol. 35, No. 1, pp. 188-198, 2008; Sprott, J., "A Simple Chaotic Delay Differential Equation," Vol. 366, No. 4-5, pp. 397-402, 2007; Tykierko, M., "Using Invariants to Change Detection in Dynamical Systems with Chaos," Vol. 237, No. 1, pp. 6-13, 2008; Chakraborty, S., Sarkar, S., and Ray, A., "Symbolic Identification and Anomaly Detection in Complex Dynamical Systems," in 2008 American Control Conference, Seattle, Wash., 2008, pp. 2792-2797; Rao, C., Ray, A., Sarkar, S., and Yasar, M., "Review and Comparative Evaluation of Symbolic Dynamic Filtering for Detection of Anomaly Patterns," Vol. 3, No. 2, pp. 101-114, 2009; Hively, L., Protopopescu, V., and Munro, N., "Epilepsy Forewarning via Phase Space Dissimilarity," Vol. 22, pp. 402-409, 2005. The methodologies are largely silent on the specific detection and analysis of normal operating states of deterministically chaotic systems. This is particularly true for analysis of experimental data of a chaotic system.

A new visualization technique is provided that represents a significant advance over current visualization techniques for the general understanding of the dynamics of deterministically chaotic systems. Consider a system exhibiting deterministic chaos. The mathematical space best used for understanding the dynamics of this system is that of embedding phase space. Due to the nature of the system, as deterministically chaotic, there exists a wholesale revisiting of the entire phase space by the chaotic behavior. See, e.g., Sprott, J., "A Simple Chaotic Delay Differential Equation," Vol. 366, No. 4-5, pp. 397-402, 2007. This revisiting of previous regions of the phase space is a representation of the property of ergodicity and closely follows the Poincaré Recurrence Theorem.

Due to this ergodicity, there exists an ability to understand the manners by which a chaotic system revisits certain regions of phase space. Eckmann et al. utilized the property of ergodicity to create recurrence plots (RP), described below. See Eckmann, J., Kamphorst, S., and Ruelle, D., "Recurrence Plots of Dynamical Systems," Vol. 4, No. 9, pp. 973-977, 1987. The RP describes the timing of revisitation of regions of the phase space, especially for larger dimensional systems. The purpose of RP is to indicate, for a given moment in time, the times at which a phase space trajectory revisits the same area in the phase space as the point under consideration. Taken as a matrix, the RP can indicate the wholesale revisiting of the phase space.

Consider a point $\vec{x}(i)$ on the orbit describing a dynamical system in d-dimensional embedding phase space, for i= 1, ..., N. The RP is an array of pixels, in a N×N square, where a pixel is colored at (i,j) if x(j) is within some small distance $\epsilon$ of x(i). The RP should be viewed as a binary N×N matrix where element (i,j) is assigned 1 if x(j) is within some small distance E of x(i), otherwise it is assigned 0. This matrix is fairly symmetric with respect to the identity diagonal; however, this symmetry is not a necessary condition of the RP. The RP indicates times in which points revisit the embedding phase space in an ergodic fashion. This can be used to determine system dynamics such as quasiperiodicity. Diagonal lines parallel with a central diagonal of the RP matrix indicate periodicity within the dynamic system, and the longer these diagonal lines are, the greater the periodic component of the system.

Figure 5:
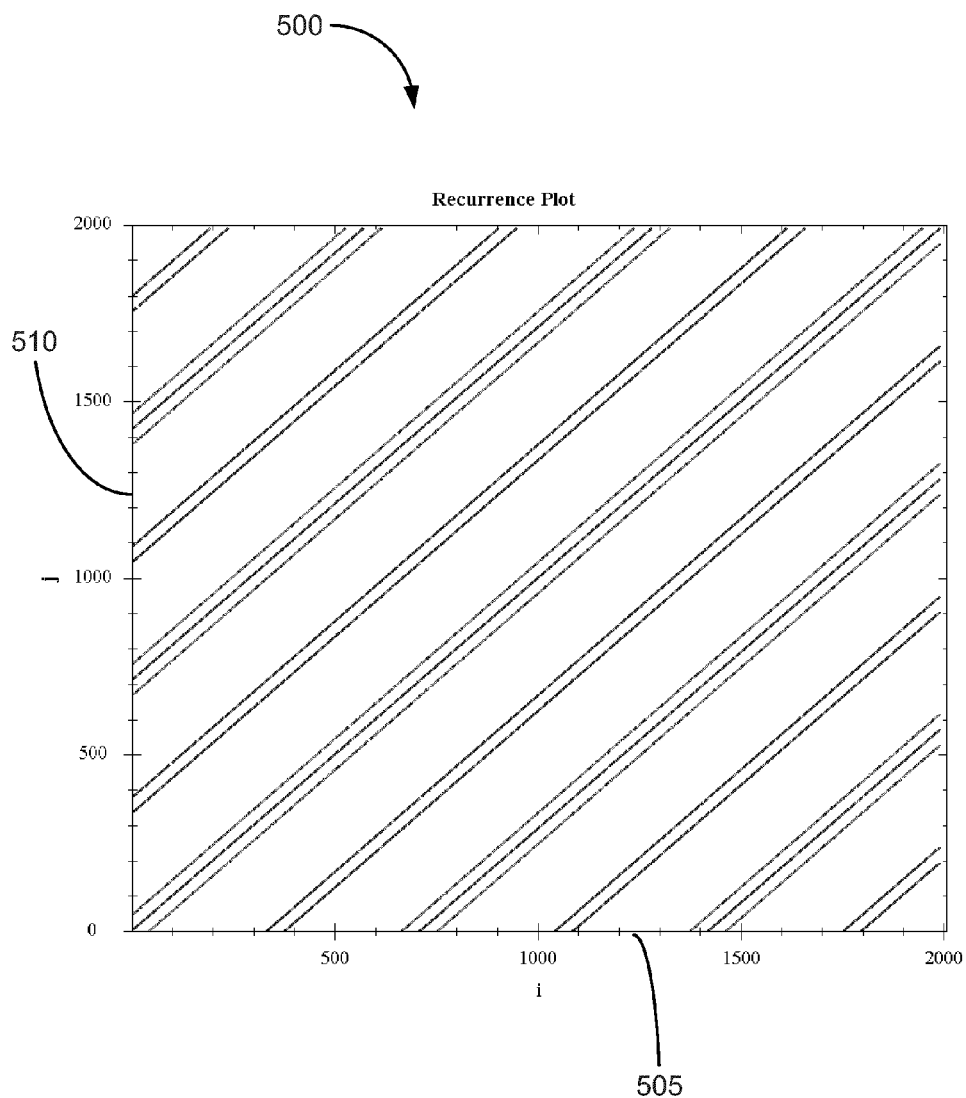
FIGS. 5 and 6 are recurrence plots of sample systems according to exemplary embodiments.
Figure 6:
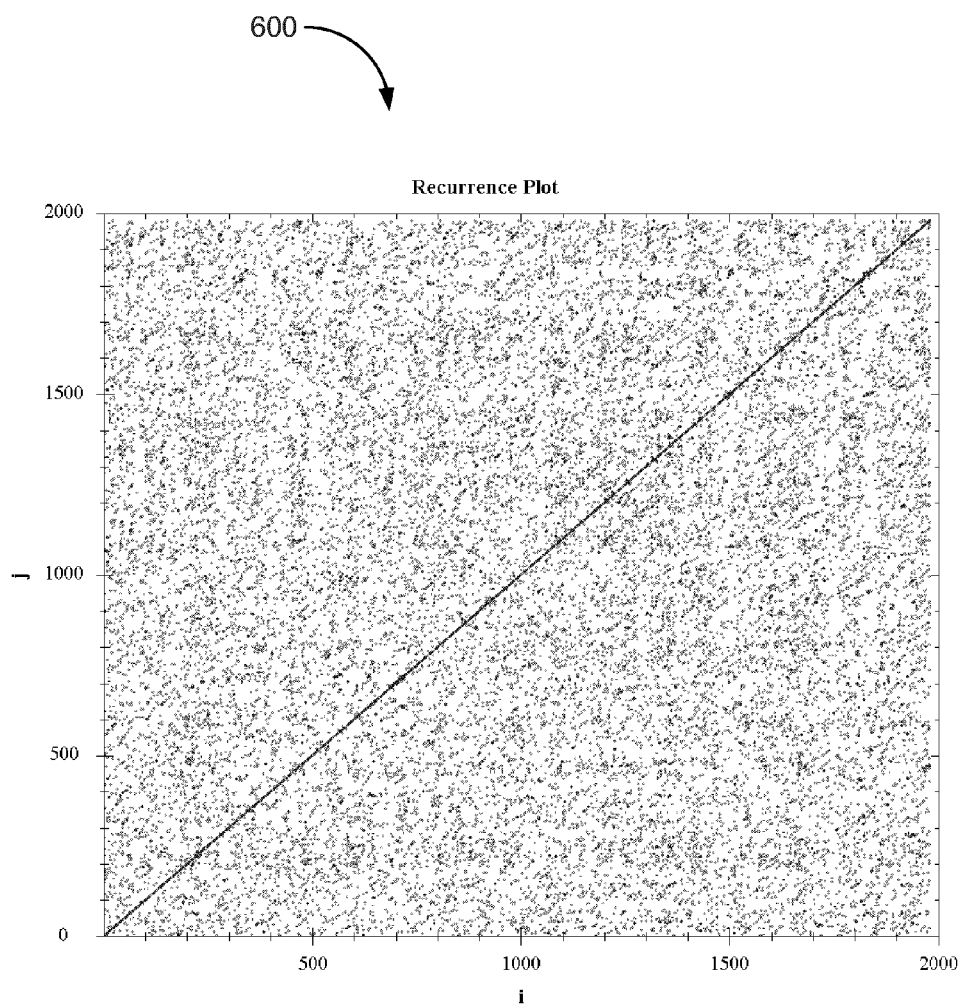

Consider a periodic system, $x_t=\sin(t)$, and a chaotic system, $x_t=\sin(2\pi x_{t-1})$. FIG. 5 illustrates a recurrence plot associated with the periodic system. FIG. 6 illustrates a recurrence plot associated with the chaotic system. The recurrence plot does not offer a clear understanding of the normal activity of visiting regions of phase space, rather just what times points are in similar regions. It is difficult to determine clearly from the RP which regions of phase space are being revisited and at what frequency these regions are visited. Further, the RP does not give a clear indication of normal local dynamics of the system. Certain regions of chaotic systems are more divergent while other regions tend to converge. See, e.g., Eckhardt, B. and Yao, D., "Local Lyapunov Exponents in Chaotic Sytems," Vol. 65, No. 1-2, pp. 100-108, 1993. This information is not clearly portrayed in the RP.

A new ergodicity plot (EP) using square or fractal partitioning may be used to better represent the course grained dynamics of the system. Through an imposed fractal partitioning, coupled with the rate of divergence, the ergodicity plot affords a clearer understanding of the dynamics under consideration.

Figure 7:
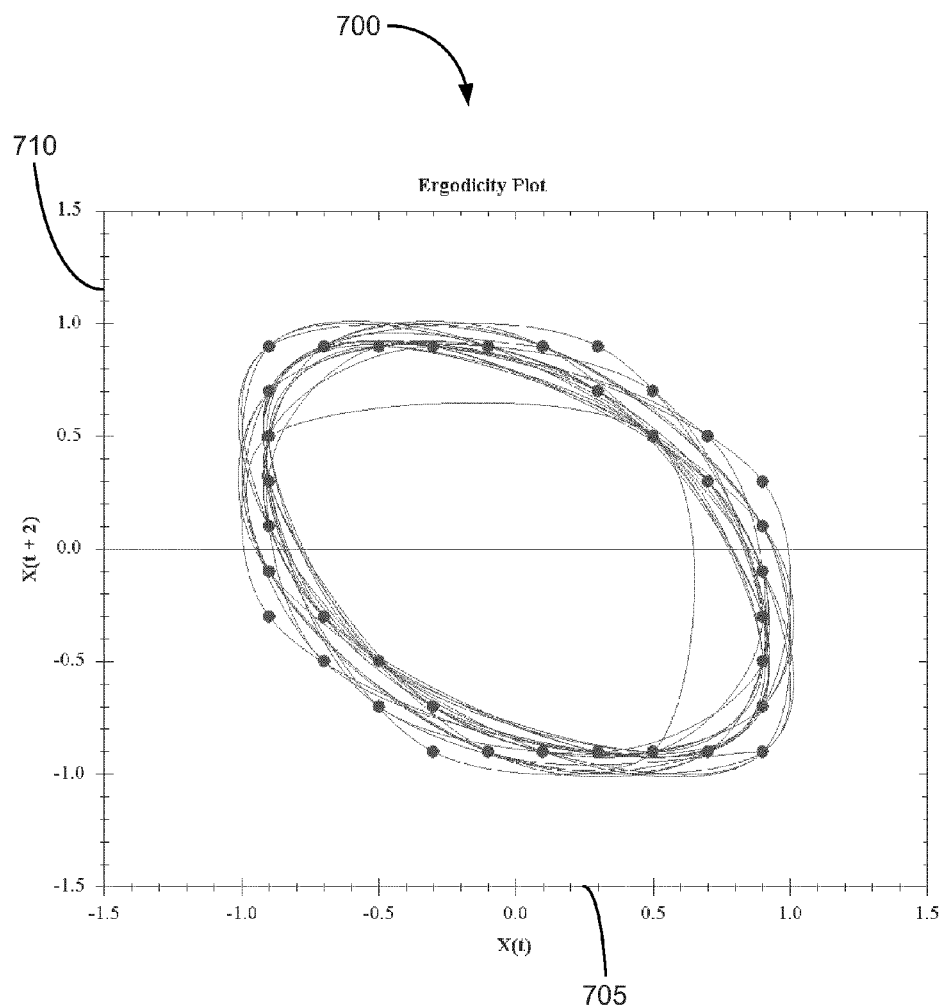
FIGS. 7 and 8 are ergodicity plots of the sample systems associated with FIGS. 5 and 6, respectively, according to exemplary embodiments.
Figure 8:
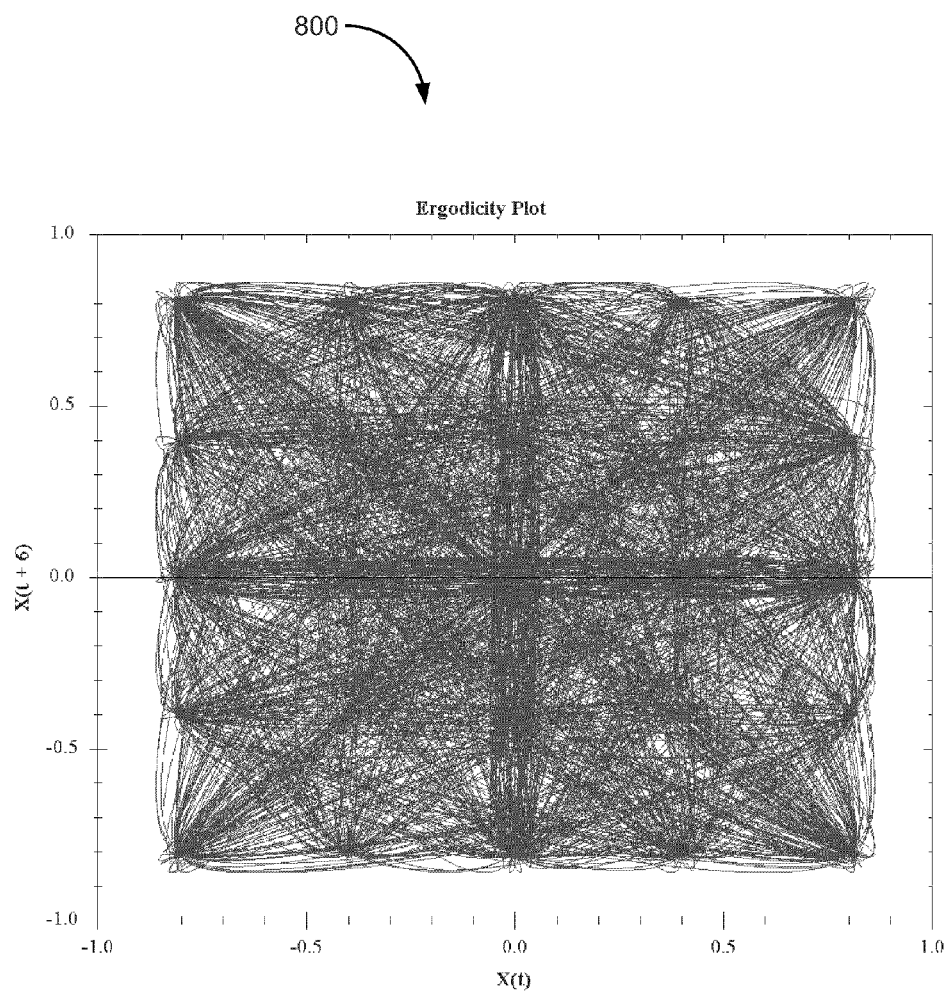

The EP of a system allows for better visualization of the regions of phase space being dynamically visited by the system and the states in which the dynamical system finds itself at given times. FIGS. 7 and 8 illustrate the EP for the periodic and chaotic systems (with N=10 in FIG. 7 and N=5 in FIG. 8) modeled in the recurrence plots shown in FIGS. 5 and 6, respectively, according to exemplary embodiments. From FIGS. 7 and 8, it is clear that the systems revisit specific regions of the phase space in a recurring fashion, a fact that was not abundantly clear in the RP of the systems. Additionally, the ergodicity plot indicates the states that are traversed during the ergodic revisiting of previous states.

The exemplary ETM-based state change detection methods disclosed herein may be applied to detection of threats in a cybersecurity context. Specifically, such methods may be used to characterize the normality of computing systems (e.g., single computing systems, systems including multiple computing devices, etc.) with different event parameters. An ETM of normality in a cybersecurity context may be generated, for example, when the computing system or systems being analyzed are not under a cyber attack (e.g., malware or spam attack). Separate ETMs of normality may be generated for each different event parameter or condition (e.g., standalone system with no users, standalone system with users, single system with users and network connectivity, etc.). A partial ETM of normality for a single computing system with no users, according to an exemplary embodiment, is provided in Table 3:

TABLE 3

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0.307692 | 0.538462 | 0.076923 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

TABLE 3-continued

| | | | | | | |
|---|---|---|---|---|---|---|
| 0 | 0 | 0 0 0 0 0 0 0 0 0 0 0 0 0 | 0 | 0 | 0 |
| 0 | 0 | 0 0 0 0 0 0 0 0 0 0 0 0 0 | 0 | 0 | 0 |
| 0 | 0 | 0 0 0 0 0 0 0 0 0 0 0 0 0 | 0 | 0 | 0 |
| 0 | 0 | 0 0 0 0 0 0 0 0 0 0 0 0 0 | 0 | 0 | 0 |
| 0 | 0 | 0 0 0 0 0 0 0 0 0 0 0 0 0 | 0 | 0 | 0 |
| 0 | 0 | 0 0 0 0 0 0 0 0 0 0 0 0 0 | 0 | 0 | 0 |
| 0 | 0 | 0 0 0 0 0 0 0 0 0 0 0 0 0 | 0 | 0 | 0 |
| 0 | 0 | 0 0 0 0 0 0 0 0 0 0 0 0 0 | 0 | 0 | 0 |
| 0 | 0 | 0 0 0 0 0 0 0 0 0 0 0 0 0 | 0 | 0 | 0 |
| 0 | 0 | 0 0 0 0 0 0 0 0 0 0 0 0 0 | 0 | 0 | 0 |
| 0 | 0 | 0 0 0 0 0 0 0 0 0 0 0 0 0 | 0 | 0 | 0 |
| 0.666667 | 0.333333 | 0 0 0 0 0 0 0 0 0 0 0 0 0 | 0 | 0 | 0 |
| 0 | 0 | 0 0 0 0 0 0 0 0 0 0 0 0 0 | 0.008734 | 0.917031 | 0.004367 |

Figure 9:
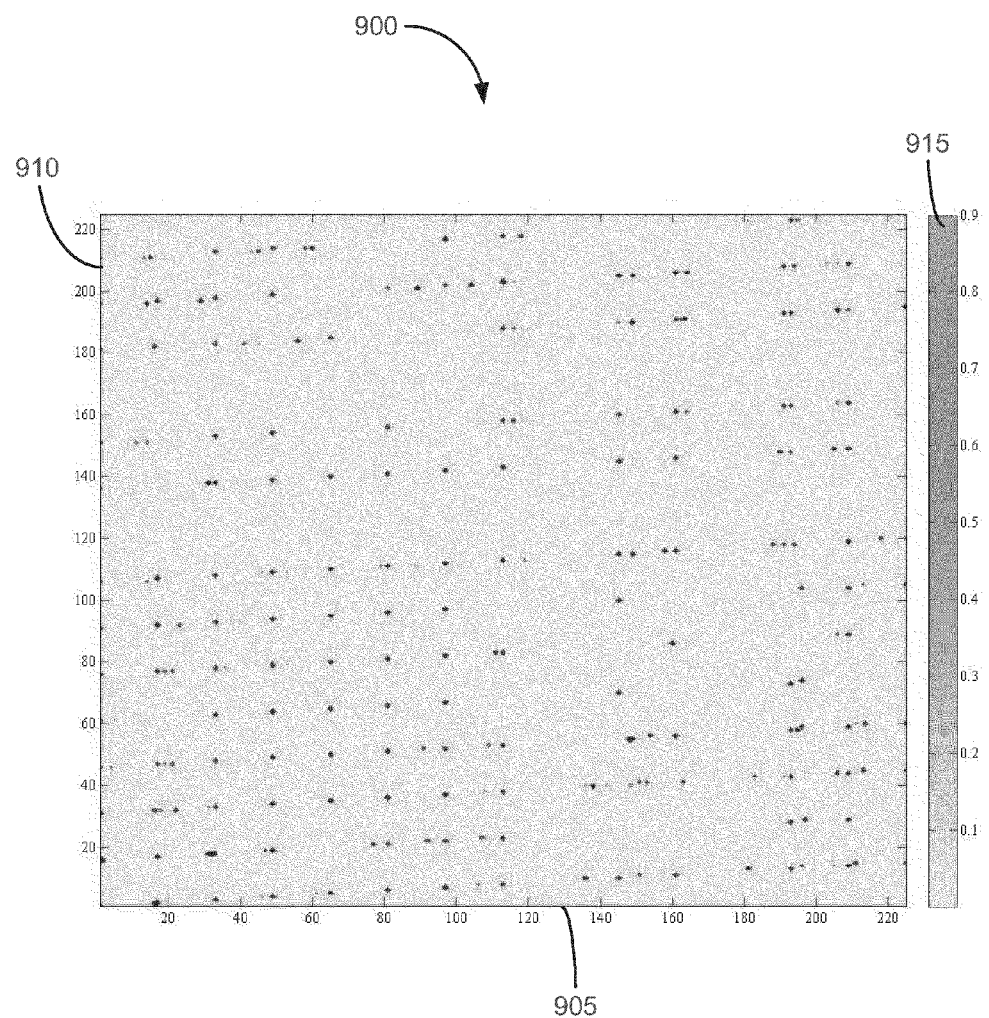
FIG. 9 is a contour plot of a sample ergodic transition matrix of normality for a single computer system with no users according to an exemplary embodiment.
Figure 10:
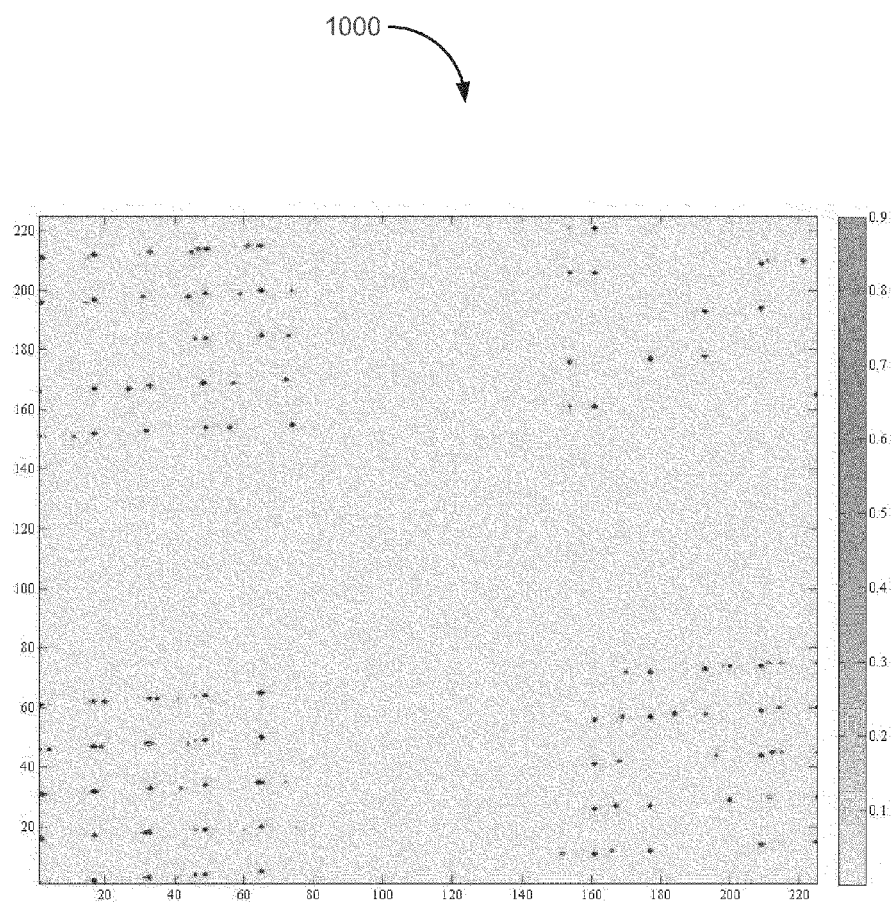
FIG. 10 is a contour plot of a sample ergodic transition matrix of normality for a single computer system with one or more users according to an exemplary embodiment.
Figure 11:
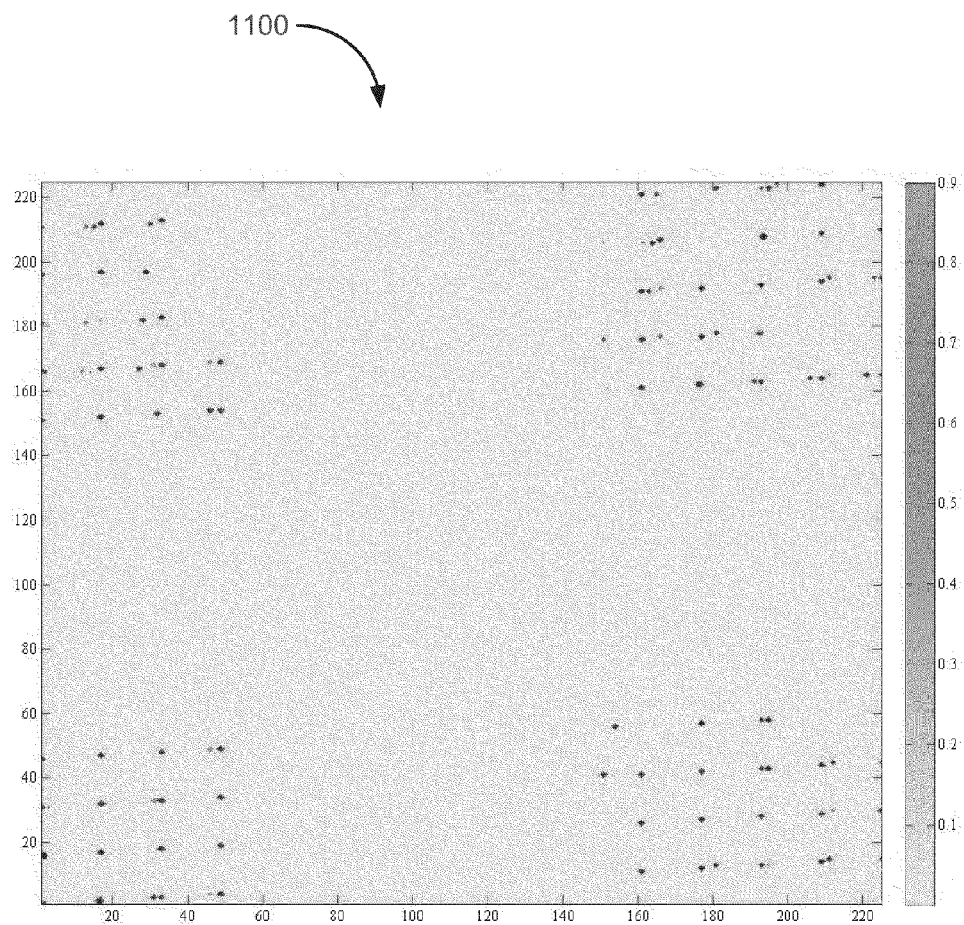
FIG. 11 is a contour plot of a sample ergodic transition matrix of normality for a single computer system that has one or more users and is connected to a network according to an exemplary embodiment.

As with the partial ETM of normality shown in Table 1, the sparsity of the sample ETM of normality in the cybersecurity context is evident upon inspection of Table 3. FIGS. 9, 10, and 11 are contour plots of sample ergodic transition matrixes of normality for a single computing system with no users, a single computing system with users, and a single computing system with users and network connectivity, respectively, according to exemplary embodiments. The values on the horizontal and vertical axes (e.g., axes 805 and 810) represent columns and rows in the ETMs of normality. The relative values at particular cells of the ETM of normality are represented by the size and/or darkness of each point in the contour plot, with darker points representing higher values (e.g., as shown in scale 815).

As can be seen in FIGS. 9 through 11, there are distinct differences in the ETM of normality for the three variants of the single pc system. The ETM of normality for these systems, in one embodiment, is based on a 15×15 partition of the phase space and the actual ETM being stored in a comma delimited file occupies approximately 100 Kb of disk space. Therefore, the ETM is highly effective at representing the dynamics of the cyber system in an extremely compact footprint.

Figure 12:
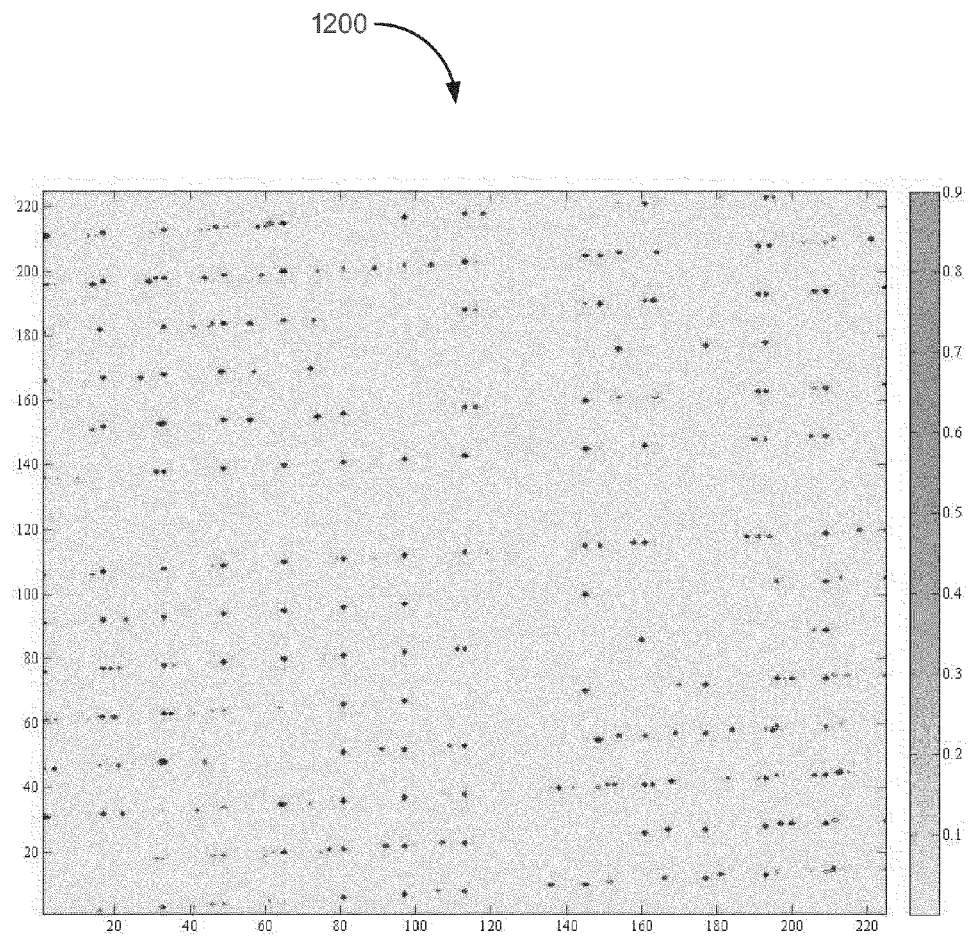
FIG. 12 is a contour plot of the absolute differences between the ergodic transition matrix of normality associated with the contour plot shown in FIG. 9 (e.g., for a system having no users) and the ergodic transition matrix of normality associated with the contour plot shown in FIG. 10 (e.g., for a system having users) according to an exemplary embodiment.

A mathematical understanding of the difference between a single pc system without users and one with users is accessible through the ETM of normality for each of these systems. Calculating the absolute difference between the ETM of normality for a non-user system and the ETM of normality of a user system generates a matrix which describes, mathematically, the differences in the dynamics of the two systems. FIG. 12 illustrates this point though the contour plot of the absolute differences between the ETM of Normality for the single pc system without users (e.g., as shown in FIG. 9) and the ETM of Normality for the single pc system with users (as shown in FIG. 10) according to an exemplary embodiment.

Figure 13:
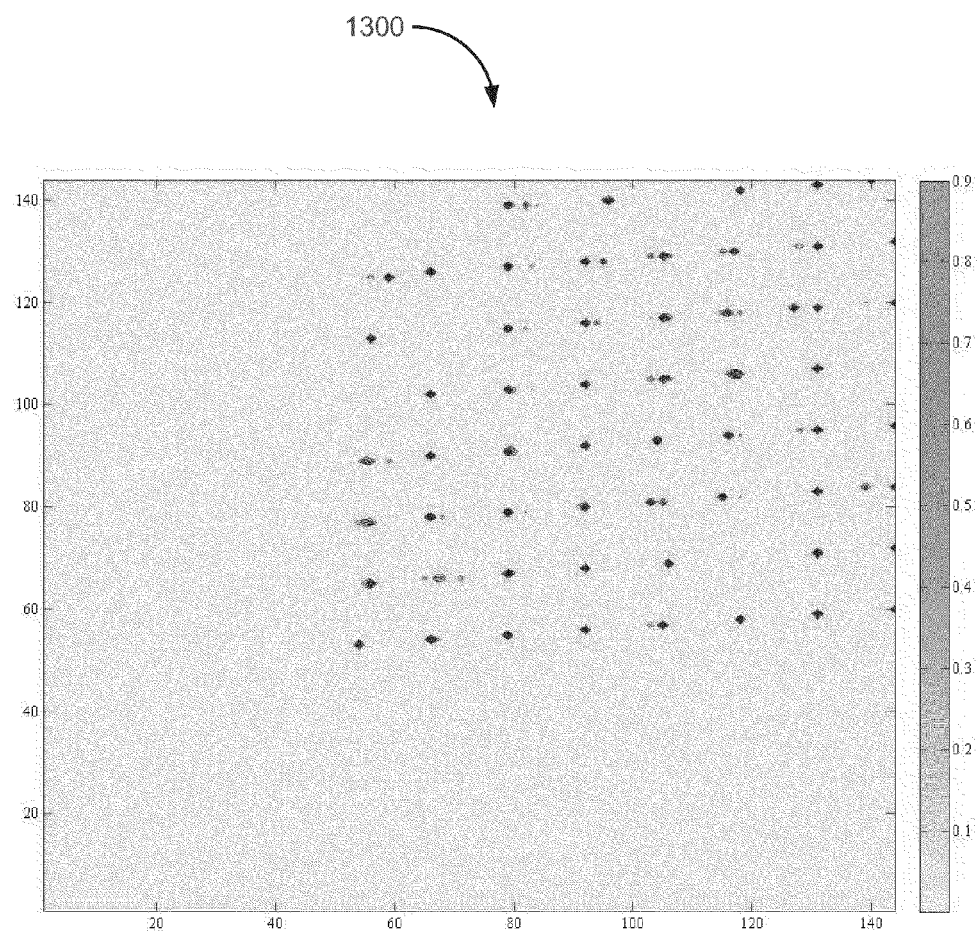
FIG. 13 is a contour plot of a sample ergodic transition matrix of normality for an intrusion detection dataset according to an exemplary embodiment.

Referring now to FIG. 13, another contour plot is shown illustrating an ETM of normality for an intrusion detection dataset (e.g., a DARPA intrusion detection dataset consisting of Internet Protocol (IP) traffic capture) according to an exemplary embodiment. The ETM of normality was generated using a first week's worth of data, which was reported as clean and free of anomalies. The second week's dataset was used as the testing set, streamed into the ETM-based anomaly detection algorithm. The buffer window for the dataset was generated repeatedly and anomalies were detected. The anomalies detected were then compared with a set of "tagged" anomalies in the intrusion detection dataset. A confusion matrix illustrating the results is shown in Table 4:

TABLE 4

| | True Anomaly | False Anomaly |
|---|---|---|
| True Anomaly | 42 | 8 |
| False Anomaly | 1 | 12,432,000 |

As can be seen from Table 4, the ETM anomaly detection algorithm correctly identified 42 of the 43 tagged anomalies within the IP traffic. The ETM anomaly detection algorithm also erroneously identified eight data points as anomalous. As discussed above, in some embodiments, user-adjustable parameters may be used to reduce false positive rates.

In some embodiments, the ETM-based state change detection methods described with respect to various exemplary embodiments may be modified for use with a phase space having an embedding dimension of d, where d may be any dimension (e.g., greater than two, such as three, five, ten, etc.). The time-delay reconstructed phase space may be embedded in a d dimensional hypercube (e.g., a d dimensional analogue of a square, with d=2, or a cube, with d=3), forming a new space, termed a bounding space, from which an ergodic transition matrix of the ergodic orbits of the system may be generated and used to detect changes in the state of the system.

In some embodiments, a d dimensional hypercube may be created, where d is the embedding dimension of the time-delay phase space. The hypercube contains the time-delay phase space as well as regions which may not be visited by the system under consideration. This hypercube is termed the bounding space of the ergodic orbits of the system. A partition (e.g., possibly a fractal partition) is imposed on the bounding space, and the data points within the bounding space are mapped to the centroid of the cell of the partition which contains that point. This mapping forms the course grained representation of the ergodicity of the system under consideration. The transition from one partition cell to another is viewed as a traversal of the ergodic orbits of the system in a course grained context, or a transition between system states for the chaotic system. These transitions can be transformed numerically into a sparse two dimensional matrix which is used to detect changes in the chaotic system in a computationally simple manner, as described above with respect to various exemplary embodiments.

Let $\Psi$ be the time-delay embedding phase space of a chaotic system, S (e.g., in a Euclidean space), with time-delay and embedding dimension d. Let $s_i(t) \in S$ for $I=1, 2, \ldots, n$ be a discrete measurement of S at a given time t. Due to the chaotic nature of S, there exists an inherent ergodicity of S over $\Psi$. As such, orbits are formed in a quasi-periodic fashion in S, which are used for monitoring of the system for any deviation from norm of S. Let E be an n-dimensional hypercube which contains Ψ, as well as other points not necessarily in the system S. Thus, E forms the bounding space of Ψ. Then, we can impose on E a, possibly fractal, partition P and map the points $e_{i1,i2,\ldots,in} \in P$ (where is the jth cell of the ith dimension of the hypercube) to the centroid of the cell $p_{i1,i2,\ldots,in} \in P$ which contains the point $e_{i1,i2,\ldots,in}$.

The use of the hypercube defined bounding space affords the detection of both parametric and population-based changes to the system. The detection of parametric changes is represented by changes in the time-delay phase space. See, e.g., Crutchfield, J. and Young, K., "Inferring Statistical Complexity," Vol. 63, No. 2, pp. 105-108, 1989. The E-machine of Crutchfield and Young may not detect population-based changes in which the population (time-series data) has experienced a system shift while maintaining similar probabilities of transition. This type of deviation may be captured in the hypercube defined bounding space.

The partition, P, imposed on the bounding space is useful for the creation of a sparse matrix of transitions of the ergodic orbits of the system. From P, we can form a 2 dimensional matrix M of size $\Pi_{k=1}^{n} i_k \times \Pi_{k=1}^{n} i_k$, where $i_k$ is the size of the kth dimension of the hypercube E. We can then assign to each cell, $m_{i,j} \in M$, the probability, ρ, of transitioning from $e_{i1,i2,\ldots,in}$ to $e_{j1,j2,\ldots,jn}$ with consideration given to the exponential divergence or convergence of the system at the transition from $e_{i1,i2,\ldots,in}$ to $e_{j1,j2,\ldots,jn}$. The probability value assigned to cell, $m_{i,j} \in M$ may be simply the number of times in E the transition from $e_{i1,i2,\ldots,in}$ to $e_{j1,j2,\ldots,jn}$, is encountered, normalized by the total number of single step ergodic transitions in E with respect to the local divergence or convergence of the system at the transition point (which may be represented by the local Lyapunov exponent, λ). In some embodiments, the probability value may be calculated as follows:

$$m_{i,j} = \rho(e_{i1,i2,\ldots in}, e_{j1,j2,\ldots jn}) = \frac{\|e_{i1,i2,\ldots in} \to e_{j1,j2,\ldots jn}\|}{\|e_{trans}\|}$$

The resulting matrix may be referred to as the ETM of E. Given an ETM $M_{t0}$ for the hypercube E containing the time-delay embedding of the system S at time $t_0$ and an ETM $M_{t1}$ for the hypercube E containing the time-delay embedding of the system S at time $t_1$, the deviation, δ, of $M_{t1}$ from $M_{t0}$ can be calculated as follows:

$$\delta(M_{t0}, M_{t1}) = \sum_{i,j} |m_{i,j}(t_0) - m_{i,j}(t_1)|$$

The deviation of the system represents the amount of shift, possibly as a direct outlier, experienced in the system S between times $t_0$ and $t_1$. Given a user defined threshold, ε, the deviations may be used to monitor the system to detect system shifts or anomalies which arise through the deviation, δ, of $M_{t1}$ from $M_{t0}$. This ETM deviation methodology can operate as a detection system such that an anomaly or shift would be reported for conditions in which δ>ε.

The creation of the ETM forms a sparse two dimensional matrix (e.g., due to the size of the bounding hypercube in relation to the time-delay phase space). As such, the computation of the deviations, δ, between matrices is computationally simple. In various embodiments, the ETM detection methodology may be used in a real-time or near real-time environment to perform system shift and anomaly detection even in systems where the minimum embedding dimension is greater than two dimensions.

In one exemplary embodiment, the operation of exemplary systems and methods described herein may be demonstrated using a standard Henon Map (shown below, with a=1.4 and b=0.3) to which small changes are imposed on the system:

$$x_{n+1} = y_n + 1 - ax_n^2$$

$$y_{n+1} = bx_n$$

The ETM of normality for the Henon Map may be created through the use of the first 4500 iterations of the map, with the first 500 of these iterations removed as possible transients to ensure the map is on the attractor. The partition of the hypercube used in this exemplary embodiment is a square 20×20 partition. Deviations are manually imposed on the Henon Map in the next 4000 iterations through a change made to the x variable at a single, randomly selected, interval. The imposed deviation results in small (e.g., less than 10%) additive noise on the single instance of the x variable of the system. This single instance of additive noise propagates throughout the remainder of the iterations due to sensitivity on initial conditions. The deviation described here results in changes to the population of the system rather than parametric changes. The ETM for this second dataset is then created and compared to the ETM of normality.

Figure 14:
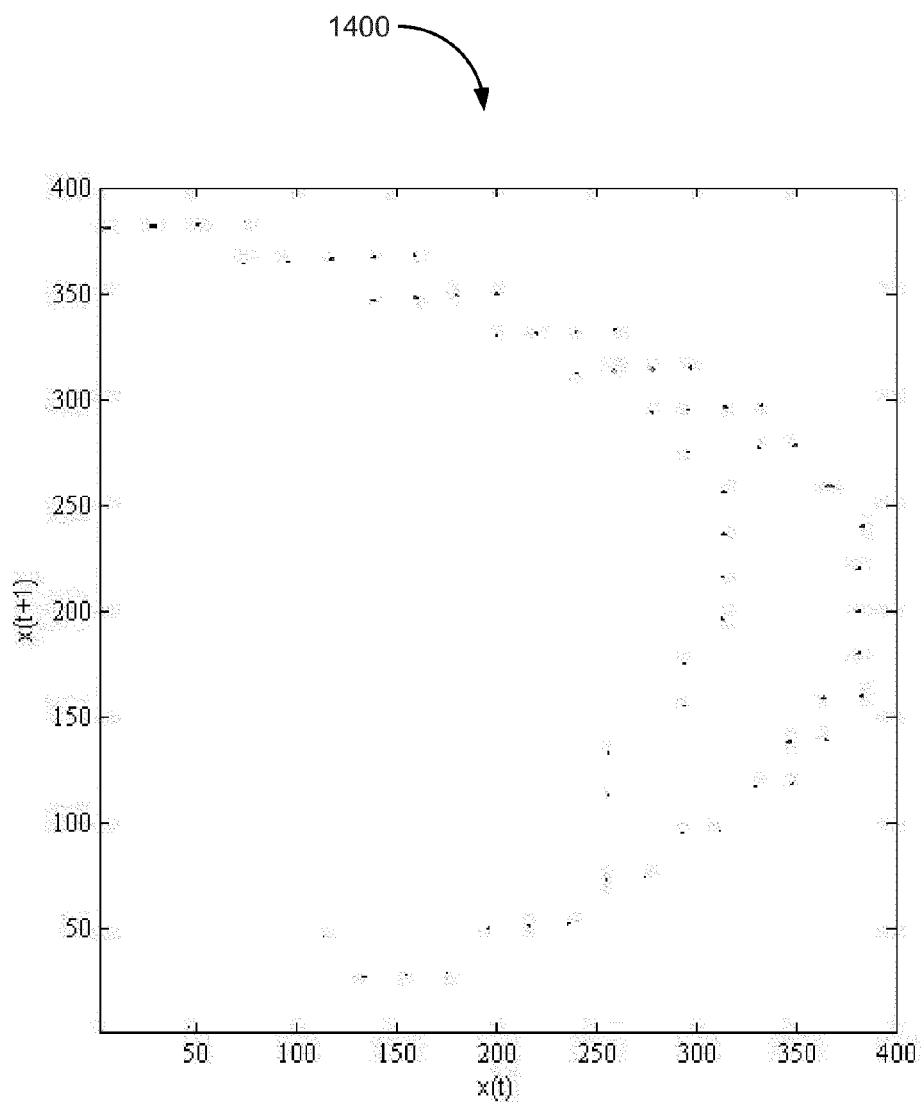
FIG. 14 is a contour plot of a sample ergodic transition matrix of normality for the Henon Map according to an exemplary embodiment.
Figure 15:
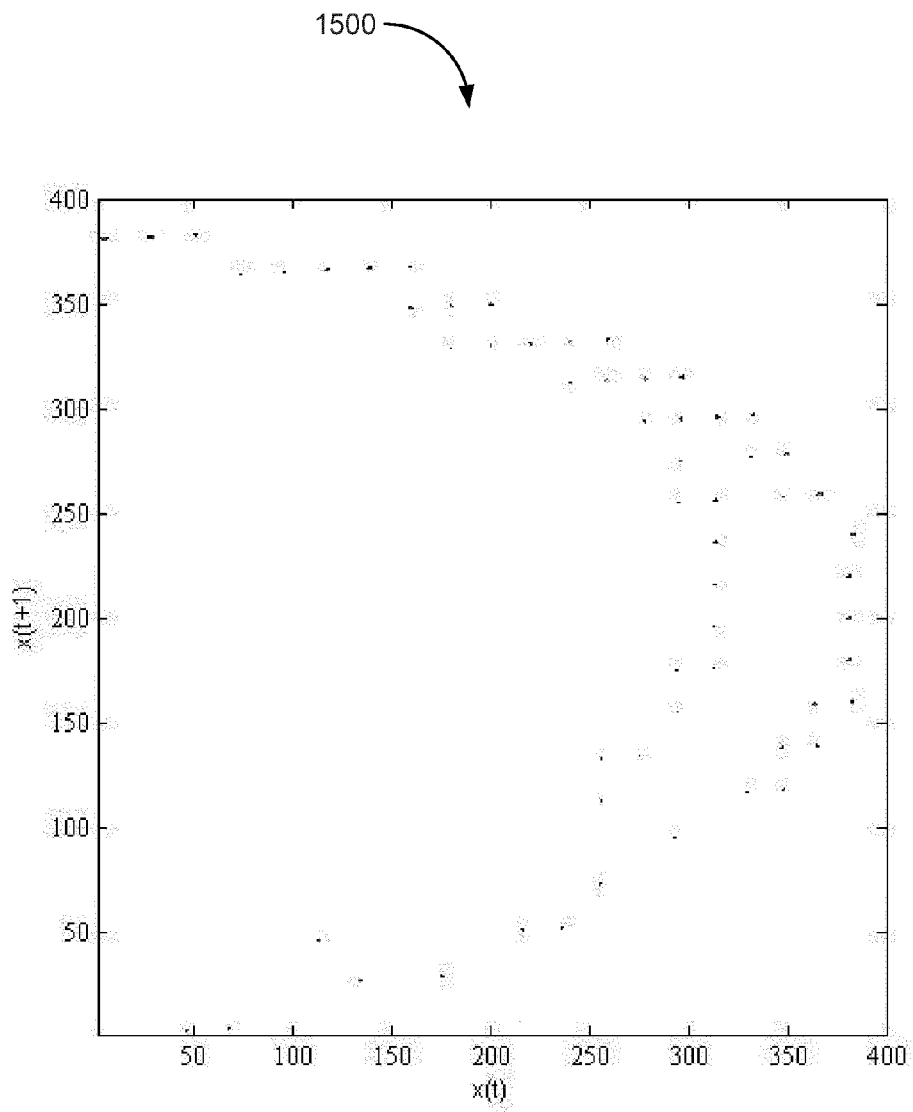
FIG. 15 is a contour plot of a sample ergodic transition matrix for a second Henon Map dataset having a single data point changed from the dataset associated with FIG. 14 according to an exemplary embodiment.

FIGS. 14 and 15 illustrate contour plots associated with the ETM of normality and the ETM of the second dataset, respectively, according to exemplary embodiments. It may be difficult to visualize from FIGS. 14 and 15 that there is a detectable change in the datasets. To facilitate observation of the change, the absolute differences between the ETM of normality and the ETM of the second dataset for the Henon Map are shown in the contour plot of FIG. 16.

Figure 16:
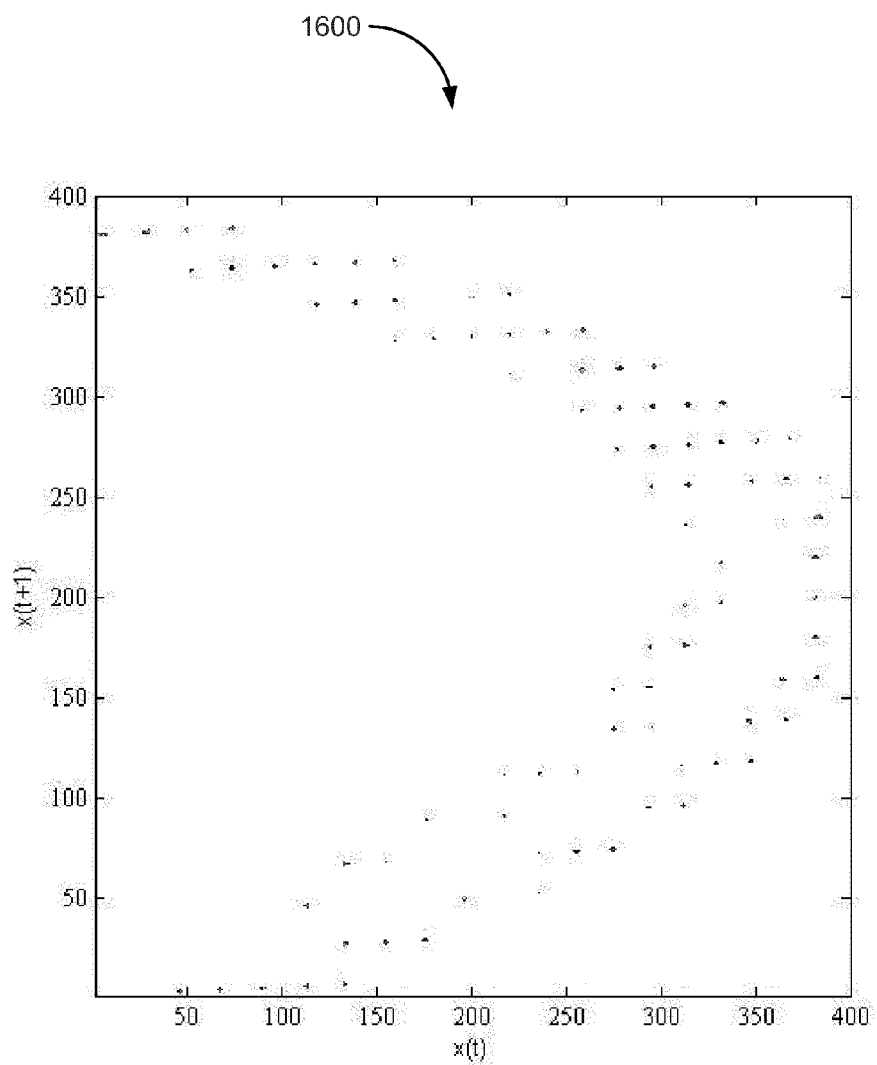
FIG. 16 is a contour plot of the absolute differences between the ergodic transition matrix of normality associated with the contour plot shown in FIG. 14 and the ergodic transition matrix associated with the contour plot shown in FIG. 15 according to an exemplary embodiment.

As can be seen in FIG. 16, the ETM-based anomaly and shift detection methodology applied in this exemplary embodiment is capable of detecting small changes to the system. The contour plot of FIG. 16 indicates that the system did experience a change in its population values. An analysis of these absolute differences resulted in a total absolute difference of 0.214, with a standard deviation of $9.85 \times 10^{-4}$ for the differences, a median difference of $6.97 \times 10^{-4}$, and an average difference of $1.34 \times 10^{-6}$. The average transition probability difference indicates that the ETM detection methodology applied in the exemplary embodiment is capable of detecting even extremely small shifts in the system (e.g., a population-based shift).

Figure 17:
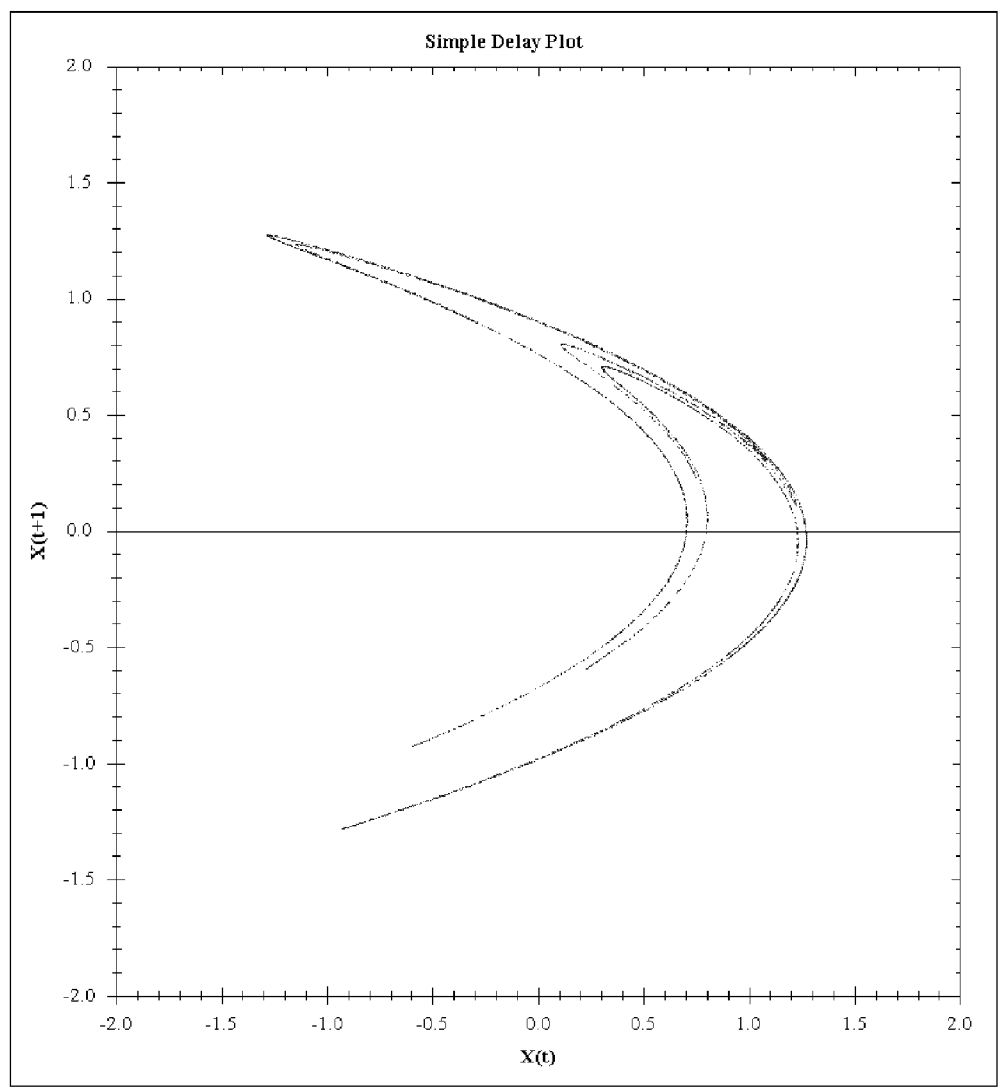
FIG. 17 is a phase space plot of the Henon Map according to an exemplary embodiment.
Figure 18:
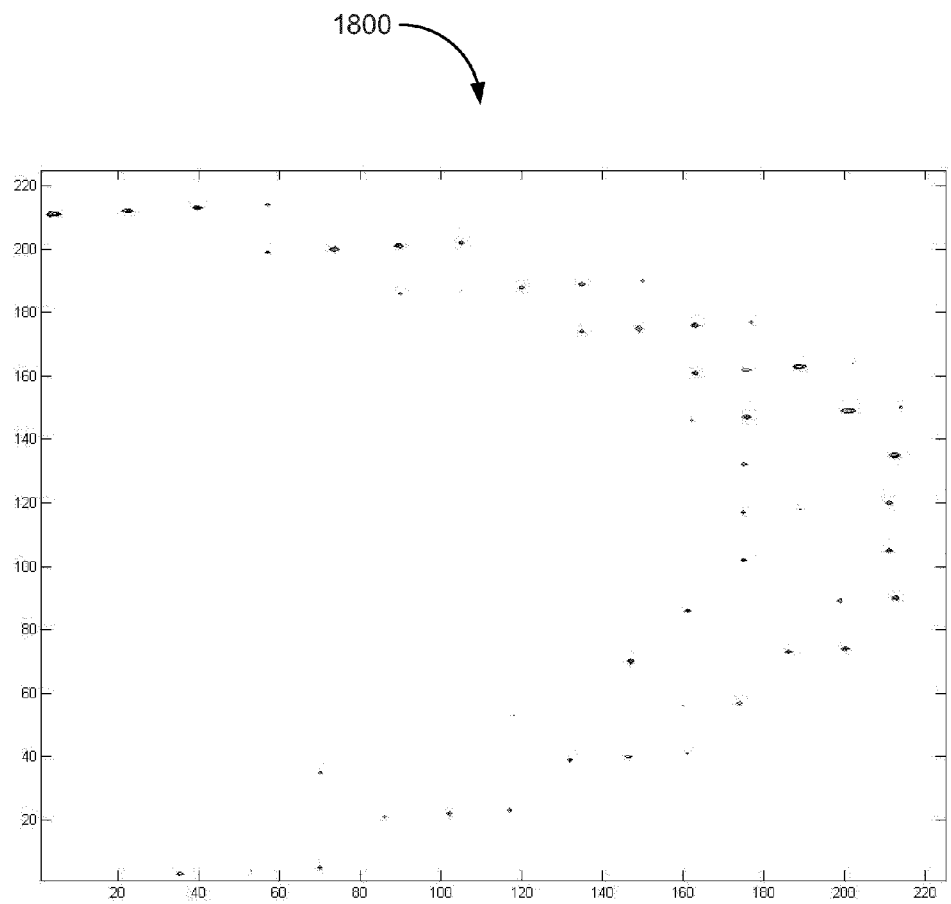
FIG. 18 is a contour plot of a sample ergodic transition matrix for the Henon Map associated with FIG. 17 according to an exemplary embodiment.
Figure 19:
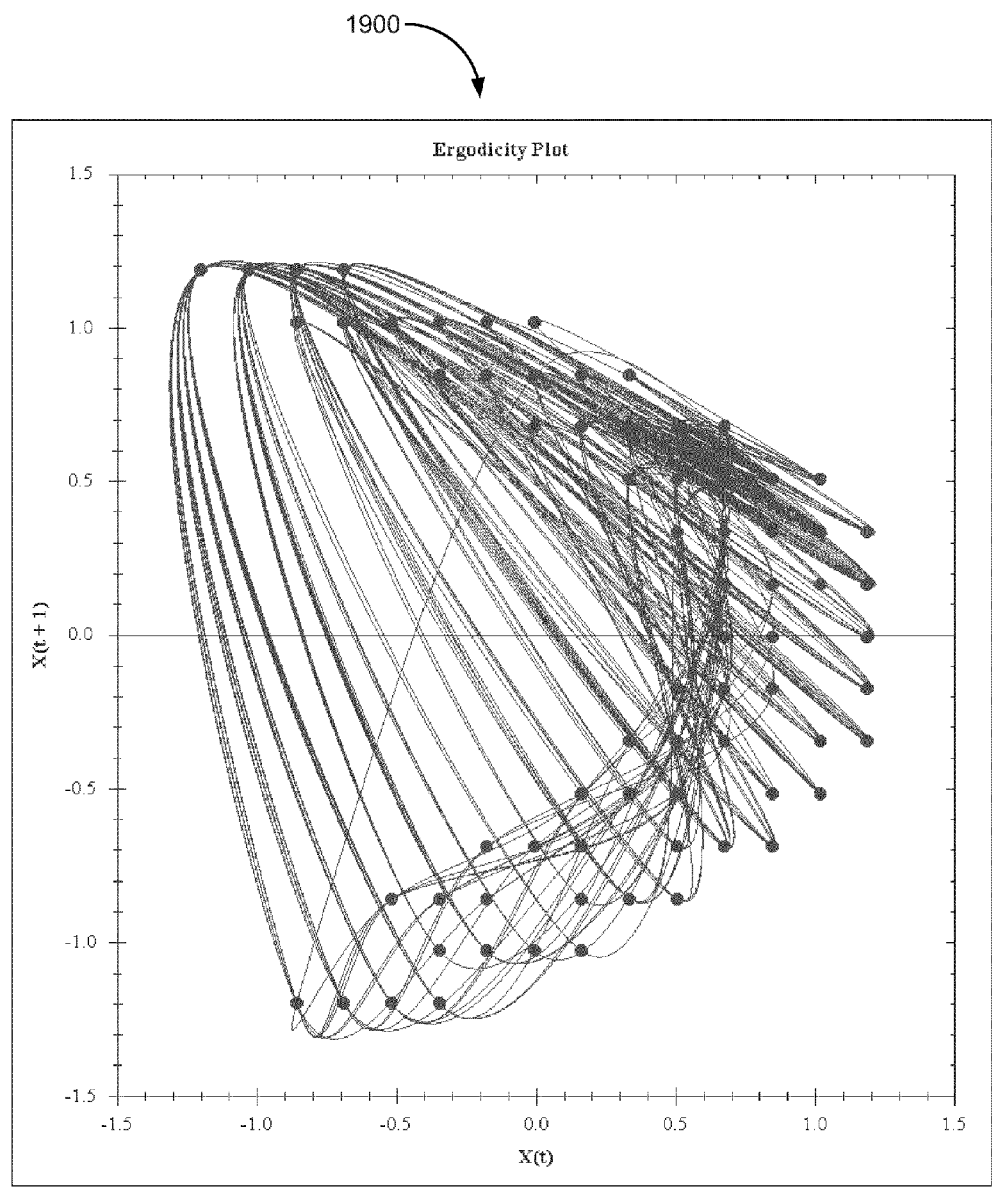
FIG. 19 is an ergodicity plot of the Henon Map associated with FIGS. 17 and 18 according to an exemplary embodiment.

Referring now to FIGS. 17 through 19, further exemplary embodiments illustrating the Henon Map are shown. FIG. 17 illustrates a phase space plot 1700 of the Henon Map. FIG. 18 illustrates a contour plot associated with the ETM of normality for the Henon Map illustrated in FIG. 17. FIG. 19 illustrates an ergodicity plot associated with the Henon Map illustrated in FIG. 17. Inspection of FIGS. 17 through 19 illustrates the relationship between the ergodicity plot and the other types of plots that may be used to represent the Henon Map and provides an understanding of how the ergodicity plot is used to illustrate state transitions in the Henon Map.

The Henon Map discussed above with respect to FIGS. 14 through 16 is a standard Henon Map that is free from noise. Noise is present in many applicational situations. In some systems, noise reduction techniques may be employed prior to attempted system analysis and/or anomaly detection. See, e.g., Schreiber, T., "Extremely Simple Nonlinear Noise-Reduction Method," Vol. 47, No. 4, pp. 2401-2404, 1993; Grassberger, P., Hegger, R., Kantz, H., Schaffrath, C., and Schreiber, T., "On Noise Reduction Methods for Chaotic Data," Vol. 3, No. 2, pp. 127-142, 1993; Lang, M., Gua, H., Odegard, J., Burrus, C., and Wells, R., "Noise Reduction using an Undecimated Discrete Wavelet Transform," Vol. 3, No. 1, pp. 10-12, 1996.

Figure 20:
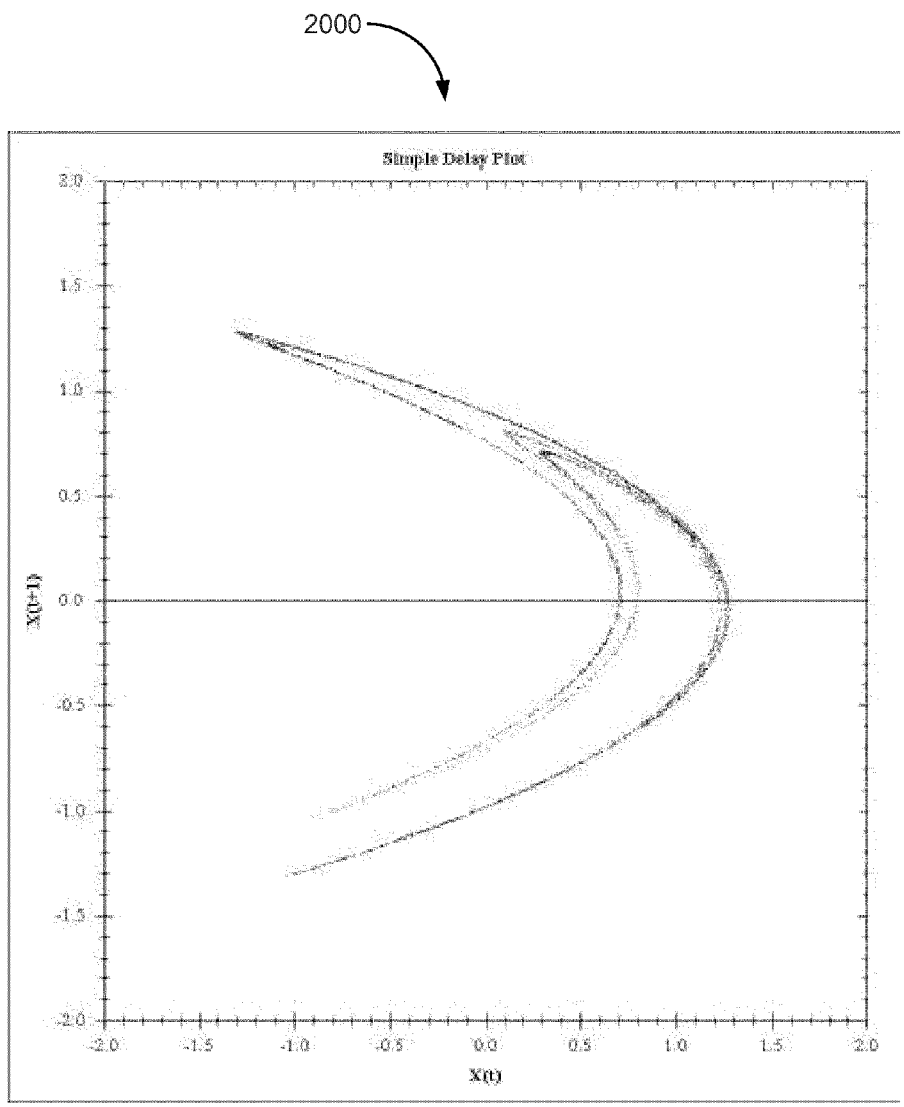
FIG. 20 is a phase space plot of the Henon Map with additive noise according to an exemplary embodiment.
Figure 21:
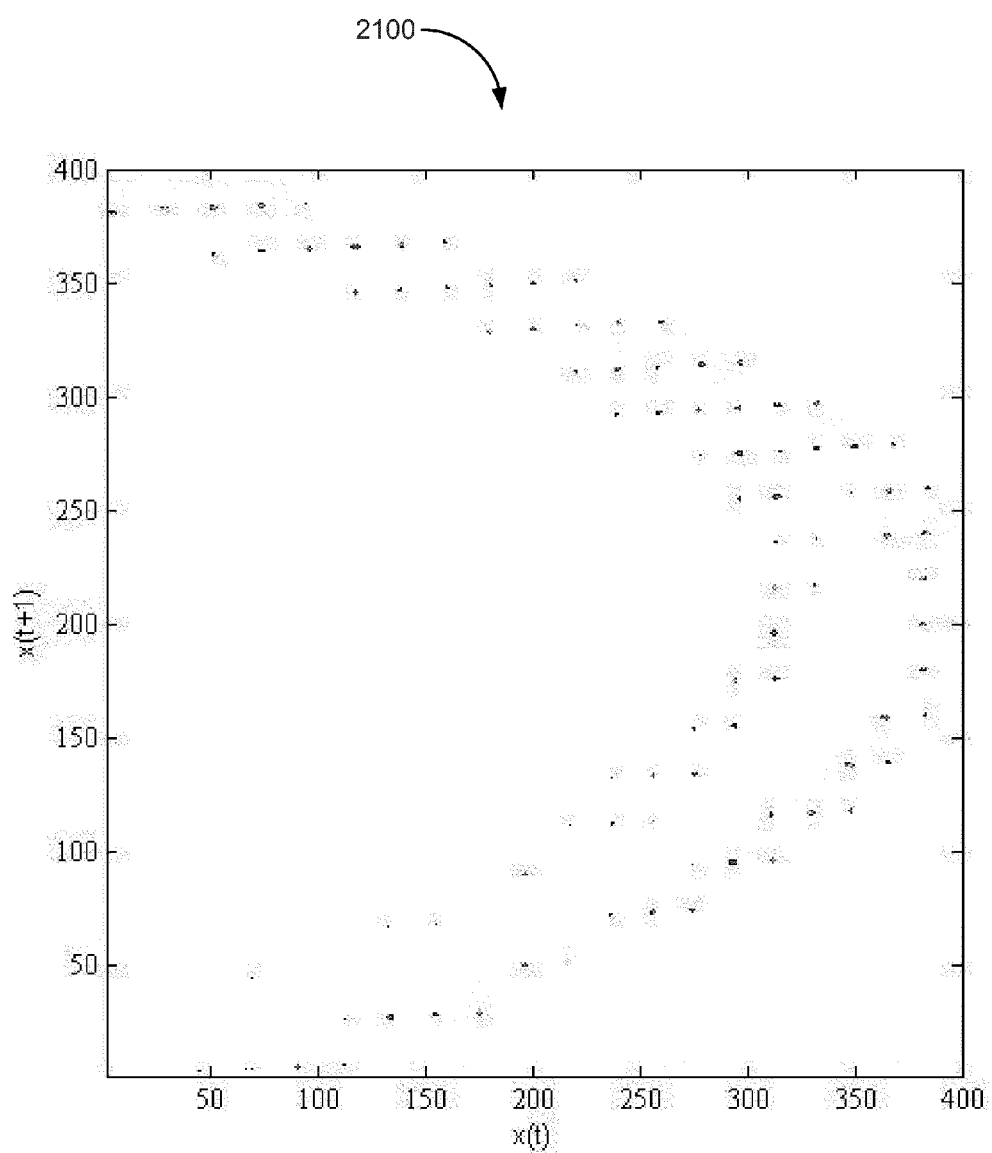
FIG. 21 is a contour plot of the absolute differences between an ergodic transition matrix of normality associated with the noisy Henon Map of FIG. 20 and the ergodic transition matrix of a single changed iteration of the noisy Henon Map according to an exemplary embodiment.

Referring now to FIGS. 20 and 21, it is illustrated according to exemplary embodiments that an ETM-based state change detection method may be used to accurately detect changes even in the presence of noise. The Henon Map reflected in FIGS. 20 and 21 is identical to that discussed with respect to FIGS. 14 through 16 with the exception of the addition of random Gaussian noise, with zero mean and a small standard deviation, added at each iteration. FIG. 20 illustrates the time-delay phase space plot 2000, in two dimensions, of the first 4500 iterations, with the first 500 removed as transients, of the Henon Map with added noise.

From FIG. 20, it can be seen that the ergodicity of the noisy Henon Map is similar to the standard Henon Map and that the overall attractor topology is maintained, with minimal variations due to the additive noise. The ETM of normality for the noisy Henon Map was created as described above for the standard Henon Map. As before, a single, randomly selected, iteration of the second 4000 iterations was changed, which then impacted the remaining iterations and an ETM of that dataset was created. FIG. 21 illustrates, with a contour plot, the absolute differences of these two ETMs, effectively illustrating that the ETM detection methodology is capable of detection of system shifts, and anomalies, even in the presence of noise.

The contour plot of the absolute differences of the transition probabilities of the two ETMs for the noisy Henon Map indicates that the system did experience a change in its population values. An analysis of these absolute differences resulted in a total absolute difference between the two ETMs of 0.237, a standard deviation of $9.56 \times 10^{-4}$ for the differences, a median difference of $7.50 \times 10^{-4}$, and an average difference of $1.48 \times 10^{-6}$. The average difference also indicates that the ETM detection applied in this exemplary embodiment is capable of detecting extremely small shifts in the system, even in the presence of noisy data.

Figure 22:
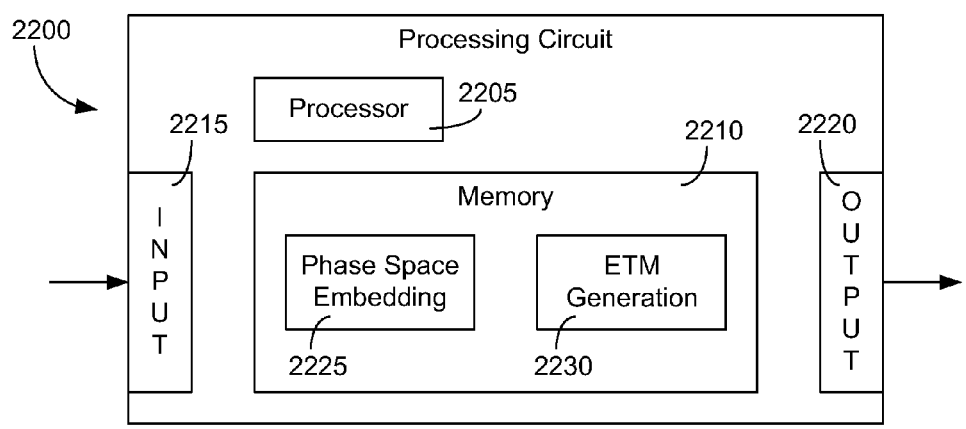
FIG. 22 is a block diagram of a processing circuit configured to detect changes in the state of a system according to an exemplary embodiment.

Referring now to FIG. 22, a block diagram of a processing circuit 2200 that may be used to implement one or more of the exemplary methods described herein is shown according to an exemplary embodiment. Processing circuit 2200 includes at least one processor 2205, which may be any general purpose or special purpose processor (e.g., FPGA, CPLD, ASIC, etc.). In some embodiments, processor 2205 may be chosen based on the type of application with which processing circuit 2200 is being utilized. Processing circuit 2200 also includes a memory 2210 that may be any type of computer or machine-readable media (e.g., hard drive, flash memory, ROM, RAM, EEPROM, CD, DVD, etc.). Processing circuit 2200 may also include an input interface 2215 for receiving input data relating to the system or process being analyzed and an output interface 2220 for outputting signals (e.g., data related to an EP and/or E™). In some embodiments, processing circuit 2200 may be networked to one or more other processing circuits. In some embodiments, processing circuit 2200 and one or more other processing circuits may be employed to perform various operations (e.g., in a distributed computing environment).

Memory 2210 may be configured to store one or more modules having instructions that are executable by processor 2205. For example, memory 2210 may include a phase space embedding module 2225 configured to generate a reconstructed phase space and embed time series data for a system being predicted within the reconstructed phase space. Once the reconstructed phase space has been generated and the data has been embedded in the reconstructed phase space, an ETM generation module 2230 may be configured to generate one or more ETMs and/or EPs (e.g., according to various exemplary embodiments described herein).

According to one exemplary embodiment, a method of detecting a change in the state of a system is provided. The method comprises embedding time series data relating to the system within a reconstructed phase space. The method further comprises partitioning the reconstructed phase space into a plurality of regions. The method further comprises generating a matrix having a plurality of cells, wherein the matrix comprises a row and a column for each of the plurality of regions, and wherein a value stored in each cell is based on a probability that the system will transition from a first region associated with the cell to a second region associated with the cell and a rate of separation of trajectories of the embedded data within at least one of the first region and the second region. In some embodiments, the method may comprise generating a first matrix based on a first dataset associated with a normal operating condition of the system, generating a second matrix based on a second dataset, and detecting a change in a state of the system by comparing the first matrix and the second matrix.

According to another exemplary embodiment, a method of detecting a potential security threat on a computing system is provided. The method comprises embedding time series data relating to the computing system within a reconstructed phase space. The method further comprises partitioning the reconstructed phase space into a plurality of regions. The method further comprises generating a first matrix having a plurality of cells, wherein the matrix comprises a row and a column for each of the plurality of regions, and wherein a value stored in each cell is based on a probability that the system will transition from a first region associated with the cell to a second region associated with the cell and a rate of separation of trajectories of the embedded data within at least one of the first region and the second region. The first matrix is generated using a first dataset associated with a normal operating condition of the computing system in which the computing system is not under attack from a security threat. The method further comprises generating a second matrix based on a second dataset and detecting the potential security threat on the computing system by comparing the first matrix and the second matrix. In some embodiments, detecting the potential security threat comprises determining when a difference between the first matrix and the second matrix exceeds a threshold.

According to another exemplary embodiment, a method of detecting a change in the state of a system is provided. The method comprises embedding time series data relating to the system within a reconstructed phase space having a D-dimensional embedding dimension. The method further comprises enclosing the reconstructed phase space in a D-dimensional hypercube. The method further comprises partitioning the hypercube into a plurality of regions. The method further comprises generating a matrix having a plurality of cells, wherein the matrix comprises a row and a column for each of the plurality of regions, and wherein a value stored in each cell is based on a probability that the system will transition from a first region associated with the cell to a second region associated with the cell and a rate of separation of trajectories of the embedded data within at least one of the first region and the second region. In some embodiments, the method may comprise generating a first matrix based on a first dataset associated with a normal operating condition of the system, generating a second matrix based on a second dataset, and detecting a change in a state of the system by comparing the first matrix and the second matrix.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of detecting a change in the state of a system, the method comprising:
    embedding time series data relating to the system within a reconstructed phase space to provide embedded data;
    partitioning the reconstructed phase space into a plurality of regions;
    generating a matrix having a plurality of cells, wherein the matrix comprises a row and a column for each of the plurality of regions, and wherein a value stored in each cell is based on a probability that the system will transition from a first region associated with the cell to a second region associated with the cell and a rate of separation of trajectories of the embedded data within at least one of the first region and the second region, wherein the matrix comprises a first matrix;

generating a second matrix based on another set of time series data; and comparing the first matrix and the second matrix to determine whether a change in the state of the system has occurred, wherein comparing the first matrix and the second matrix comprises:

calculating a state change parameter representing a degree of state change between a first state associated with the first matrix and a second state associated with the second matrix; and comparing the state change parameter to a threshold value;

wherein the method further comprises performing an action when the state change parameter exceeds the threshold value.

2. The method of claim 1, wherein the value stored in each cell is based on a maximum Lyapunov exponent associated with the first region or the second region.

3. The method of claim 1, wherein the second matrix represents a normal operating state of the system, and wherein the first matrix and the second matrix are compared to determine whether the system is operating in the normal operating state.

4. The method of claim 3, further comprising updating the second matrix representing the normal operating state of the system over a period of time.

5. The method of claim 4, wherein performing the action comprises activating an alarm indicating that the state change parameter has exceeded the threshold.

6. The method of claim 1, wherein embedding time series data relating to the system within a reconstructed phase space comprises maintaining a buffer of time series data and streaming new data into the buffer using a moving window method.

7. A system, comprising:

a memory; and an electronic processor operably coupled to the memory and configured to embed time series data relating to the system within a reconstructed phase space to provide embedded data;

partition the reconstructed phase space into a plurality of regions;

generate a matrix having a plurality of cells, wherein the matrix comprises a row and a column for each of the plurality of regions, and wherein a value stored in each cell is based on a probability that the system will transition from a first region associated with the cell to a second region associated with the cell and a rate of separation of trajectories of the embedded data within at least one of the first region and the second region, wherein the matrix comprises a first matrix:

generate a second matrix based on another set of time series data; and compare the first matrix and the second matrix to determine whether a change in the state of the system has occurred, wherein the electronic processor is configured to compare the first matrix and the second matrix by:

calculating a state change parameter representing a degree of state change between a first state associated with the first matrix and a second state associated with the second matrix; and comparing the state change parameter to a threshold value;

and wherein the electronic processor is further configured to perform an action when the state change parameter exceeds the threshold value.

8. The system of claim 7, wherein the value stored in each cell is based on a maximum Lyapunov exponent associated with the first region or the second region.

9. The system of claim 7, wherein the second matrix represents a normal operating state of the system, and wherein the electronic processor is configured to compare the first matrix and the second matrix to determine whether the system is operating in the normal operating state.

10. The system of claim 9, wherein the electronic processor is further configured to update the second matrix representing the normal operating state of the system over a period of time.

11. The system of claim 7, wherein the action performed by the electronic processor when the state change parameter exceeds the threshold value comprises activating an alarm indicating that the state change parameter has exceeded the threshold.

12. The system of claim 7, wherein the electronic processor is further configured to maintain a buffer of time series data and stream new data into the buffer using a moving window method.

13. One or more non-transitory computer-readable media having instructions stored thereon, the instructions being executable by one or more processors to execute a method comprising:

embedding time series data relating to the system within a reconstructed phase space to provide embedded data;

partitioning the reconstructed phase space into a plurality of regions;

generating a matrix having a plurality of cells, wherein the matrix comprises a row and a column for each of the plurality of regions, and wherein a value stored in each cell is based on a probability that the system will transition from a first region associated with the cell to a second region associated with the cell and a rate of separation of trajectories of the embedded data within at least one of the first region and the second region, wherein the matrix comprises a first matrix;

generating a second matrix based on another set of time series data; and comparing the first matrix and the second matrix to determine whether a change in the state of the system has occurred, wherein comparing the first matrix and the second matrix comprises:

calculating a state change parameter representing a degree of state change between a first state associated with the first matrix and a second state associated with the second matrix; and comparing the state change parameter to a threshold value;

wherein the method further comprises activating an alarm when the state change parameter exceeds the threshold value.

14. The one or more non-transitory computer-readable media of claim 13, wherein the second matrix represents a normal operating state of the system, and wherein the first matrix and the second matrix are compared to determine whether the system is operating in the normal operating state.

* * * * *